US011554709B2

(12) United States Patent
McGregor et al.

(10) Patent No.: US 11,554,709 B2
(45) Date of Patent: Jan. 17, 2023

(54) FOLDING ENCLOSURE

(71) Applicant: AWOL Outdoors, Inc., Eden Prairie, MN (US)

(72) Inventors: Shawn McGregor, Brooklyn Park, MN (US); Cedar Vandergon, New Brighton, MN (US); Kevin Fleischhacker, Mound, MN (US); Steven M. Koehler, Orono, MN (US)

(73) Assignee: AWOL OUTDOORS, INC., Eden Prairie, MN (US)

( * ) Notice: Subject to any disclaimer, the term of this patent is extended or adjusted under 35 U.S.C. 154(b) by 250 days.

(21) Appl. No.: 16/612,279

(22) PCT Filed: May 8, 2018

(86) PCT No.: PCT/US2018/031604
§ 371 (c)(1),
(2) Date: Nov. 8, 2019

(87) PCT Pub. No.: WO2018/208778
PCT Pub. Date: Nov. 15, 2018

(65) Prior Publication Data
US 2020/0139873 A1 May 7, 2020

Related U.S. Application Data

(60) Provisional application No. 62/503,135, filed on May 8, 2017, provisional application No. 62/543,942, filed on Aug. 10, 2017.

(51) Int. Cl.
*B60P 3/34* (2006.01)
*E04B 1/343* (2006.01)
*E04H 15/06* (2006.01)

(52) U.S. Cl.
CPC ............ *B60P 3/34* (2013.01); *E04B 1/34352* (2013.01); *E04B 1/34357* (2013.01); *E04H 15/06* (2013.01)

(58) Field of Classification Search
CPC ........ B60P 3/34; B60P 3/341; E04B 1/34352; E04B 1/34357; E04H 15/06
(Continued)

(56) References Cited

U.S. PATENT DOCUMENTS

| 243,216 A | 6/1881 | Conner |
| 1,216,986 A | 2/1917 | Habig |
| 1,276,388 A | 8/1918 | Marx |
| 1,560,802 A | 11/1925 | Julstedt |

(Continued)

FOREIGN PATENT DOCUMENTS

| CH | 635393 A5 | 3/1983 | |
| DE | 1927406 A1 * | 12/1970 | ............ E04B 1/3442 |

(Continued)

OTHER PUBLICATIONS

Photographs of awnings identified "A"-"K" made by Canvas Craft, Inc. of Otsego, MN prior to Dec. 1, 2016.
(Continued)

*Primary Examiner* — Jason S Morrow
*Assistant Examiner* — Wenwei Zhuo
(74) *Attorney, Agent, or Firm* — Steven M. Koehler; Westman, Champlin & Koehler, P.A.

(57) ABSTRACT

An aspect includes a transportable fold-out at least partial enclosure including: a center stationary section; a pair of primary platform assemblies, each primary platform including a first panel pivotally joined on opposite sides of the center stationary section and a second panel pivotally joined to the first panel on a side opposite the first panel; and at least
(Continued)

one wall assembly pivotally joined to center stationary section and one of the primary platforms.

20 Claims, 14 Drawing Sheets

(58) Field of Classification Search
USPC .................. 296/26.01, 26.06, 26.15, 165
See application file for complete search history.

(56) References Cited

U.S. PATENT DOCUMENTS

| | | | |
|---|---|---|---|
| 1,564,257 A | 12/1925 | Lippman | |
| 1,568,895 A | 1/1926 | Lyons | |
| 1,595,541 A | 8/1926 | Borah | |
| 1,596,924 A | 8/1926 | Curtis | |
| 2,248,080 A | 7/1941 | Hathaway | |
| 2,589,602 A | 3/1952 | Clark | |
| 2,832,637 A * | 4/1958 | Decosse | B60P 3/34 296/26.15 |
| 2,923,305 A | 2/1960 | Cline | |
| 2,939,691 A | 6/1960 | Lewis | |
| 2,948,576 A * | 8/1960 | Ball | B60R 9/045 312/240 |
| 2,986,150 A | 5/1961 | Torian | |
| 3,198,486 A | 8/1965 | Allen | |
| 3,200,545 A | 8/1965 | Bunge | |
| 3,239,274 A | 3/1966 | Weiss | |
| 3,288,520 A | 11/1966 | Krutzikowsky | |
| 3,302,341 A * | 2/1967 | Konopasek | B60P 3/34 52/64 |
| 3,343,866 A | 9/1967 | Massey | |
| 3,371,954 A | 3/1968 | Larsson | |
| 3,375,035 A | 3/1968 | Schultz | |
| 3,394,961 A | 7/1968 | Matte | |
| 3,429,608 A * | 2/1969 | Farnum | B60P 3/34 296/173 |
| 3,469,356 A * | 9/1969 | White | B60P 3/34 52/71 |
| 3,516,708 A | 6/1970 | Cox | |
| 3,556,581 A | 1/1971 | Silva | |
| 3,558,181 A | 1/1971 | Peterson | |
| 3,560,042 A | 2/1971 | McCarthy | |
| 3,632,153 A * | 1/1972 | Knudsen | B60P 3/34 296/169 |
| 3,652,122 A | 3/1972 | Beauregard | |
| 3,670,747 A | 6/1972 | Pohl et al. | |
| 3,698,734 A | 10/1972 | Drake | |
| 3,705,743 A * | 12/1972 | Toomey | B60P 3/36 296/168 |
| 3,715,141 A | 2/1973 | Cary | |
| 3,744,191 A | 7/1973 | Bird | |
| 3,768,855 A | 10/1973 | Laue | |
| 3,811,454 A | 5/1974 | Huddle | |
| 3,875,623 A | 4/1975 | Johnston | |
| 3,970,096 A | 7/1976 | Nicolai | |
| D243,216 S | 2/1977 | Elsby | |
| 4,034,772 A | 7/1977 | Huddle | |
| 4,067,347 A | 1/1978 | Lipinski | |
| 4,102,352 A | 7/1978 | Kirkham | |
| 4,119,224 A | 10/1978 | Moody | |
| 4,165,117 A | 8/1979 | Kaiser | |
| 4,201,359 A | 5/1980 | Baslow | |
| 4,221,398 A | 9/1980 | Pautrat | |
| 4,240,677 A | 12/1980 | Payne et al. | |
| 4,261,614 A * | 4/1981 | Rice | B60P 3/34 254/276 |
| 4,268,066 A | 5/1981 | Davis | |
| 4,358,133 A | 11/1982 | Stucky | |
| 4,452,294 A | 6/1984 | Fukuchi | |
| 4,531,847 A | 7/1985 | F'Geppert | |
| 4,577,876 A | 3/1986 | Harris | |
| 4,719,934 A | 1/1988 | Mydans | |
| 4,772,038 A | 9/1988 | MacDonald | |
| 4,817,655 A | 4/1989 | Brooks | |
| 4,826,235 A | 5/1989 | Zwick | |
| 4,878,322 A | 11/1989 | Ikeda et al. | |
| 4,942,895 A | 7/1990 | Lynch | |
| D310,806 S | 9/1990 | Hertzberg et al. | |
| D311,165 S | 10/1990 | Moore | |
| 4,976,074 A | 12/1990 | Delamare | |
| D318,446 S | 7/1991 | Magyar et al. | |
| 5,080,423 A | 1/1992 | Merlot et al. | |
| 5,107,881 A | 4/1992 | Feldman et al. | |
| D327,463 S | 6/1992 | Williams | |
| 5,118,245 A | 6/1992 | Dunkel | |
| D333,289 S | 2/1993 | Shirlin et al. | |
| 5,234,011 A | 8/1993 | Lynch | |
| 5,280,985 A * | 1/1994 | Morris | B60P 1/02 296/26.15 |
| 5,477,876 A | 12/1995 | Moss | |
| 5,487,692 A | 1/1996 | Mowrer et al. | |
| 5,490,656 A | 2/1996 | Frisby | |
| 5,526,610 A | 6/1996 | Delamare | |
| 5,575,492 A | 11/1996 | Stone | |
| 5,613,543 A | 3/1997 | Walton | |
| D382,248 S | 8/1997 | Long | |
| 5,784,842 A | 7/1998 | Wackerbauer | |
| D397,699 S | 9/1998 | Desjardins | |
| 5,829,820 A | 11/1998 | Cowsert | |
| 5,853,016 A | 12/1998 | Cowan | |
| 5,953,875 A | 9/1999 | Harkins | |
| 6,095,474 A | 8/2000 | Arnold | |
| 6,101,750 A | 8/2000 | Blesener et al. | |
| 6,217,106 B1 | 4/2001 | Reckner, Jr. | |
| 6,257,167 B1 | 7/2001 | Joaquim | |
| 6,290,450 B1 | 9/2001 | Humphries et al. | |
| 6,345,638 B1 | 2/2002 | Warner | |
| 6,474,022 B1 | 11/2002 | Double et al. | |
| 6,499,497 B1 | 12/2002 | Swetish et al. | |
| 6,502,593 B1 | 1/2003 | Stafford | |
| 6,530,165 B2 | 3/2003 | Griesemer et al. | |
| 6,550,802 B2 | 4/2003 | Sheehan | |
| 6,564,513 B2 | 5/2003 | Henbid et al. | |
| 6,679,542 B1 | 1/2004 | Semotuk | |
| 6,746,040 B2 | 6/2004 | Bordeleau et al. | |
| 6,832,571 B2 | 12/2004 | Eagles | |
| D503,143 S | 3/2005 | Napieraj | |
| D516,497 S | 3/2006 | Napieraj | |
| 7,017,975 B2 | 3/2006 | Parmer | |
| 7,052,065 B2 | 5/2006 | Rasmussen | |
| 7,073,816 B1 | 7/2006 | Larson et al. | |
| 7,186,030 B2 | 3/2007 | Schlanger | |
| 7,188,842 B2 | 3/2007 | Thorpe | |
| 7,216,896 B1 | 5/2007 | McGhie et al. | |
| 7,234,747 B2 | 6/2007 | Rasmussen | |
| 7,287,806 B1 | 10/2007 | Crean | |
| 7,452,000 B2 | 11/2008 | Winter et al. | |
| D583,746 S | 12/2008 | Napieraj | |
| D583,747 S | 12/2008 | Napieraj | |
| 7,677,625 B2 | 3/2010 | Gosselin et al. | |
| 7,681,941 B2 | 3/2010 | Freeman et al. | |
| 7,721,746 B2 | 5/2010 | Yul et al. | |
| D619,077 S | 7/2010 | Frankham | |
| D619,078 S | 7/2010 | Frankham | |
| 7,789,452 B2 | 9/2010 | Dempsey et al. | |
| 7,810,866 B2 | 10/2010 | Dempsey et al. | |
| 7,967,369 B2 | 6/2011 | Davidson | |
| 7,987,863 B2 | 8/2011 | Warner | |
| D651,678 S | 1/2012 | Muggleton | |
| 8,439,426 B2 | 5/2013 | Dempsey et al. | |
| 8,549,794 B2 | 10/2013 | Hotes | |
| 8,567,811 B1 | 10/2013 | Jones | |
| 8,899,610 B2 | 12/2014 | Venn | |
| D732,460 S | 6/2015 | Seneker et al. | |
| 9,205,881 B2 | 12/2015 | Vandergon et al. | |
| D775,056 S | 12/2016 | Wheel | |
| D780,088 S | 2/2017 | Gholston | |
| D785,542 S | 5/2017 | Patel et al. | |
| D796,420 S | 9/2017 | Abrams | |
| D812,545 S | 3/2018 | Donohoe | |
| D813,783 S | 3/2018 | Dowdey | |
| 9,926,026 B2 | 3/2018 | Vandergon et al. | |

(56) References Cited

U.S. PATENT DOCUMENTS

| | | | |
|---|---|---|---|
| D836,532 S | 12/2018 | King | |
| D865,642 S | 11/2019 | Davidson et al. | |
| 10,501,133 B2 | 12/2019 | Fleischhacker et al. | |
| 2002/0084664 A1 | 7/2002 | McManus et al. | |
| 2003/0197352 A1 | 10/2003 | Bordeleau et al. | |
| 2006/0145499 A1* | 7/2006 | Boon | B60P 3/34 296/26.14 |
| 2007/0262611 A1 | 11/2007 | Freeman et al. | |
| 2008/0055170 A1 | 3/2008 | Madden, Jr. et al. | |
| 2008/0084089 A1* | 4/2008 | Hanson | B60P 3/34 296/171 |
| 2008/0265617 A1* | 10/2008 | Davidson | B60P 3/341 296/173 |
| 2009/0188538 A1 | 7/2009 | Kim | |
| 2009/0217600 A1* | 9/2009 | De Azambuja | B65D 90/0006 52/79.5 |
| 2009/0224512 A1 | 9/2009 | Winter et al. | |
| 2011/0181006 A1 | 7/2011 | Heppner | |
| 2013/0154212 A1* | 6/2013 | Vandergon | B60P 3/341 280/13 |
| 2013/0214500 A1 | 8/2013 | Love | |
| 2014/0367991 A1* | 12/2014 | Loranger | B60P 3/341 296/165 |
| 2016/0083031 A1 | 3/2016 | Vandergon et al. | |
| 2018/0170467 A1 | 6/2018 | Fleischhacker et al. | |

FOREIGN PATENT DOCUMENTS

| | | | | |
|---|---|---|---|---|
| DE | 3824142 A1 | | 1/1990 | |
| EP | 0007580 A1 | | 2/1980 | |
| EP | 0040108 A1 | | 11/1981 | |
| FR | 2944239 A1 | * | 10/2010 | B60P 3/34 |
| FR | 2944239 A1 | | 10/2010 | |
| GB | 2359312 A | | 8/2001 | |
| JP | S47-044612 A | | 12/1972 | |
| JP | H5-98851 A | | 4/1993 | |
| JP | H09-500183 A | | 1/1997 | |
| JP | H11-123979 A | | 5/1999 | |
| JP | 2012-101767 A | | 5/2012 | |
| KR | 20-0385932 Y1 | | 6/2005 | |
| KR | 10-2012-0001903 A | | 1/2012 | |
| RU | 2021922 C1 | | 10/1994 | |
| WO | 1995003457 A1 | | 2/1995 | |

OTHER PUBLICATIONS

"Build MI's Pop-Up Camper Van", Mechanix Illustrated, Mar. 1984, pp. 108-109.

Riley et al., "The Phoenix: A High-Mileage Camper Van You Can Build", Dune Buggies & Hot VWs, Dec. 1980, pp. 60-63.

International Search Report and Written Opinion in corresponding International Application No. PCT/US2018/031604 dated Aug. 30, 2018.

* cited by examiner

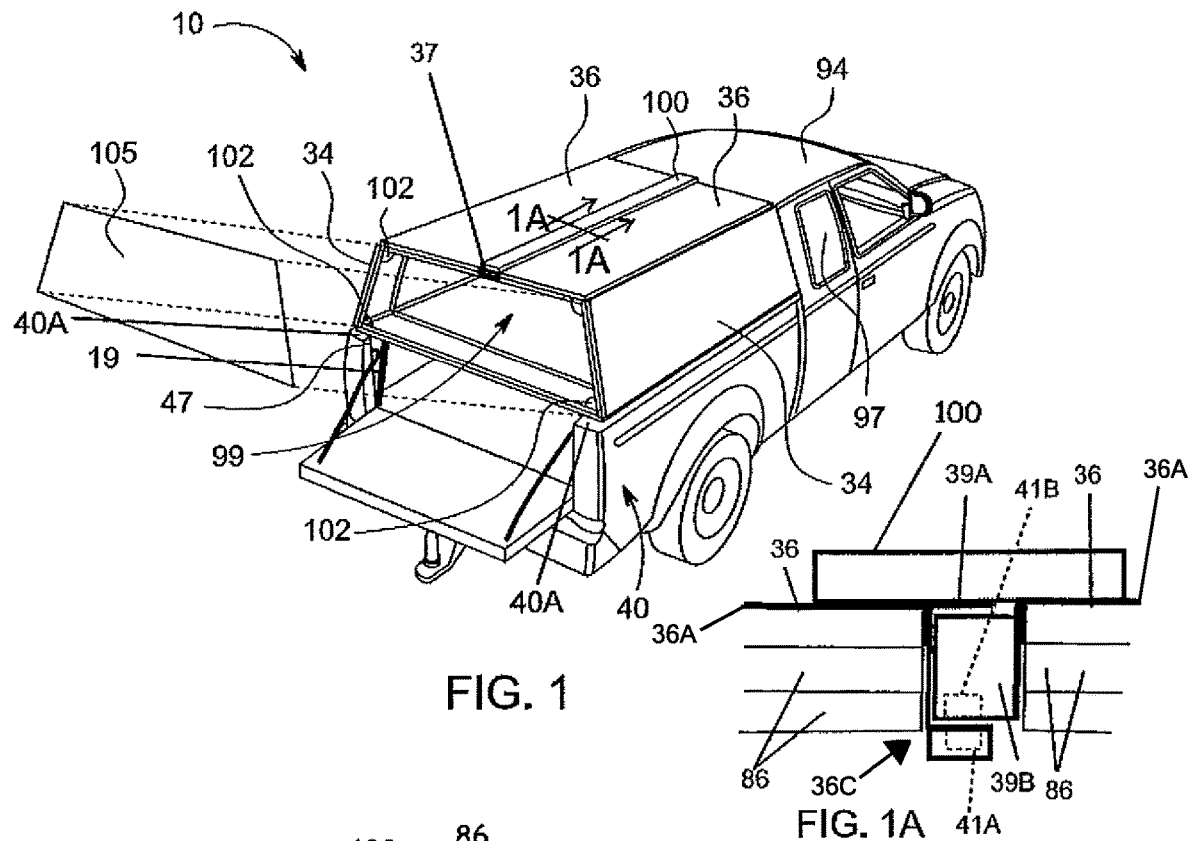
FIG. 1
FIG. 1A
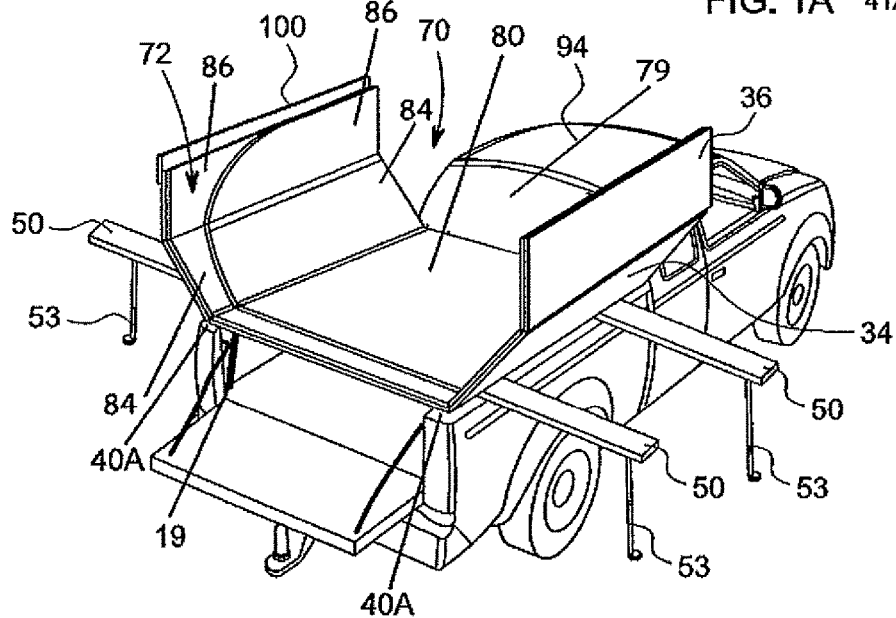
FIG. 2

FOLDING ENCLOSURE

CROSS-REFERENCE TO RELATED APPLICATION

The present application is a national stage of and claims priority of International patent application Serial No. PCT/US2018/031604, filed May 8, 2018, and published in English as WO/2018/208778, the content of which is hereby incorporated by reference in its entirety.

BACKGROUND

The discussion below is merely provided for general background information and is not intended to be used as an aid to determine the scope of the subject matter.

Various forms of portable enclosures for camping have been around for ages. Covered wagons, perhaps a more modern form of trailers given the history, provided covered living space during travel. More recent times have rendered the "pop-up" vehicle pulled trailer in which the trailer has a couple positions, a compacted travel position and an expanded use position. In addition to trailers, various forms of campers have been mounted to the bed or box of a pickup.

Early on, fuel consumption for the vehicle towing or carrying the camper was a relatively low concern. As fuel consumption rose and the expense of fuel reached new levels, society became more interested in energy efficiency. This trend expanded into an awareness of the need to protect the environment from wasteful uses of fuel. Trailers or large pickup mounted campers in the travel profile are at odds with fuel efficiency. In addition, large trailers or pickup mounted campers are difficult to store and transport.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A first general aspect includes a transportable fold-out at least partial enclosure including: a center stationary section of size to substantially conform to a width of vehicle; a pair of primary platform assemblies, each primary platform including a first panel pivotally joined on opposite sides of the center stationary section and a second panel pivotally joined to the first panel on a side opposite the first panel; and at least one wall assembly pivotally joined to the center stationary section and each of the primary platforms to pivot from a first position where the wall assembly lies upon the primary platforms and the center stationary section and a second position where the wall assembly is pivoted away from the center stationary section and each of the primary platforms, the at least one wall assembly including a center panel pivotally joined to the center stationary section and a pair of side panel assemblies, each side panel assembly including a third panel pivotally joined to the center panel and a fourth panel pivotally joined to the center panel on a side opposite the third panel.

Implementations of the first aspect may include one or more of the following features. The transportable fold-out at least partial enclosure where the enclosure includes two horizontal levels, a first level being provided by at least one of the platform assemblies. The transportable fold-out at least partial enclosure where a second horizontal level is below the first level substantially conforming to the vehicle such as a floor of a pickup box or truck rear deck. The transportable fold-out at least partial enclosure where a third horizontal level is provided above the first level. The transportable fold-out at least partial enclosure where the third horizontal level includes a compartment extending over a roof of the vehicle. The transportable fold-out at least partial enclosure where the second horizontal level includes a compartment extending over a roof of the vehicle. The transportable fold-out at least partial enclosure where a second horizontal level is provided above the first level.

A second general aspect includes a transportable fold-out at least partial enclosure including: a center stationary section; a pair of primary platform assemblies, each primary platform including a first panel pivotally joined on opposite sides of the center stationary section and a second panel pivotally joined to the first panel on a side opposite the first panel; and at least one wall assembly pivotally joined to center stationary section and one of the primary platforms.

A third general aspect includes a transportable fold-out platform including: a center stationary section; a pair of primary platform assemblies, each primary platform including a first panel pivotally joined on opposite sides of the center stationary section and a second panel pivotally joined to the first panel on a side opposite the first panel, where the primary platforms are configured to fold to a transport position where outer edges of each of the second panels on sides thereof opposite each associated first panel are positioned proximate each other and above the center stationary section.

A fourth general aspect includes a transportable fold-out at least partial enclosure including: a center stationary section; a pair of primary platform assemblies, each primary platform including a first panel pivotally joined on opposite sides of the center stationary section and a second panel pivotally joined to the first panel on a side opposite the center stationary section; and at least one wall assembly pivotally joined to the center stationary section and each of the primary platforms to pivot from a first position where the wall assembly lies upon the primary platforms and the center stationary section and a second position where the wall assembly is pivoted away from the center stationary section and each of the primary platforms, the at least one wall assembly including a center panel pivotally joined to the center stationary section and a pair of side panel assemblies, each side panel assembly including a third panel pivotally joined to the center panel and pivotally joined to one of the first panels and a fourth panel pivotally joined to the third panel and pivotally joined to the second panel.

Implementations of the second, third and fourth aspects may include one or more of the following features if not already included. The transportable fold-out at least partial enclosure where the at least one wall assembly is pivotally joined to the center stationary section and each of the primary platforms to pivot from a first position where the wall assembly lies upon the primary platforms and the center stationary section and a second position where the wall assembly is pivoted away from the center stationary section and each of the primary platforms, the at least one wall assembly including a center panel pivotally joined to the center stationary section and a pair of side panel assemblies, each side panel assembly including a third panel pivotally joined to the center panel and pivotally joined to one of the first panels and a fourth panel pivotally joined to the third panel and pivotally joined to the second panel. The transportable fold-out at least partial enclosure where the primary platforms and the at least one wall assembly are configured to fold to a transport position where outer edges of each of the second panels on sides thereof opposite each associated first panel are positioned proximate each other and above the center stationary section while each of the third panels is adjacent an associated first panel and each of the fourth panels is adjacent an associated second panel. The transportable fold-out at least partial enclosure where a gap between the each of the second panels in the transport position is covered by another panel. The transportable fold-out at least partial enclosure where the another panel is attached to one of the second panels. The transportable fold-out at least partial enclosure where the another panel is an extension of one of the second panels. The transportable fold-out at least partial enclosure and further including a cover panel configured to cover an opening formed by ends of the primary platform assemblies in the transport position. The transportable fold-out at least partial enclosure where the cover panel is releasably joined to the primary platforms assemblies or the center stationary section. The transportable fold-out at least partial enclosure and further including a second cover panel configured to cover a second opening formed by second ends of the primary platform assemblies in the transport position. The transportable fold-out at least partial enclosure and further including a frame configured to support at least partially the second panels in transport position. The transportable fold-out at least partial enclosure where the frame is disposed between the second center panel and the fourth panels of the second wall assembly. The transportable fold-out at least partial enclosure and further including at least one lateral support extending laterally below each primary platform and configured to support each associated first and second panel when in an extended position where the first and second panels are at least substantially parallel to each other. The transportable fold-out at least partial enclosure where each the lateral supports is disposed under the center stationary section in the transport position and is adjustable so as to be positioned underneath each associated primary platform in the extended position. The transportable fold-out at least partial enclosure and a second wall assembly pivotally joined to the center stationary section and each of the primary platforms on sides opposite the at least one wall assembly to pivot from a first position where the second wall assembly lies upon panels of the at least one wall assembly and a second position where the wall assembly is pivoted away from the center stationary section and each of the primary platforms, the second wall assembly including a second center panel pivotally joined to the center stationary section and a second pair of side panel assemblies, each second side panel assembly including a third panel pivotally joined to the center panel and pivotally joined to one of the first panels and a fourth panel pivotally joined to the third panel and pivotally joined to the second panel. The transportable fold-out at least partial enclosure where the canopy is secured to an outer edge of the second wall assembly. The transportable fold-out at least partial enclosure where the canopy is secured to outer edges of each of the second panels. The transportable fold-out at least partial enclosure where one of the wall assemblies includes a door. The transportable fold-out at least partial enclosure where the primary platforms and the at least one wall assembly are configured to fold to a transport position where outer edges of each of the second panels on sides thereof opposite each associated first panel are positioned proximate each other and above the center stationary section. The transportable fold-out at least partial enclosure and further including a canopy secured to an outer edge of the at least one wall assembly. The transportable fold-out at least partial enclosure and further including at least one ground support for each primary platform configured to engage a ground surface and support each associated first and second panel when in an extended position where the first and second panels are at least substantially parallel to each other. The transportable fold-out at least partial enclosure where the center stationary section includes downwardly extending walls below the primary platforms when extending outwardly from the center stationary section. The transportable fold-out at least partial enclosure where opposed walls of the downwardly extending walls include apertures configured to receive lateral supports therethrough and into space between the opposed walls.

A fifth general aspect includes a transportable at least partial enclosure including: a platform, a first wall joined to the platform, a second wall joined to the platform spaced apart from the first wall, a roof structure having a center roof section and a first side roof panel pivotally joined to the center roof section and a second side roof panel pivotally joined to the center roof section on a side opposite the first side roof panel assembly, a first plurality of center section extendible supports coupled to the center roof section to lift the center roof section, and at least one side roof panel extendible support for each side roof panel to lift each side roof panel.

Implementations of the fifth aspect may include one or more of the following features. The transportable at least partial enclosure where each of the first wall and the second wall are pivotally joined to the platform where the first wall is configured to pivot from and to an extended position where each wall is substantially orthogonal to the platform. The transportable at least partial enclosure where the first wall is configured to pivot to and from the extended position of the first wall to a first wall lowered position adjacent the platform and where the second wall is configured to pivot to and from the extended position of the second wall to a second lowered position over the first wall. The transportable at least partial enclosure where the platform includes a stationary center section and a first primary platform pivotally joined to the stationary center section and a second primary platform pivotally joined to the stationary center section on a side opposite the first primary platform, the first side roof panel being disposed above the first primary platform and the second side roof panel being disposed above the second primary platform, each of the first primary platform and the second primary platform being pivotal with respect to the stationary center section from a position over the center section to an extended position extending away from the center section. The transportable at least partial enclosure where each of the walls include a center panel pivotally joined to the center stationary section a first wall panel pivotally joined to the center panel and pivotally joined to first primary platform and a second wall panel pivotally joined to the center panel and pivotally joined to the second primary platform where the first and second primary platforms are pivotable toward and away from each other. The transportable at least partial enclosure and further including a second extendible support for each of the side roof panels configured to lift each corresponding side roof panel with the associated at least one side roof panel extendible support. The transportable at least partial enclosure and further including a lateral support configured to support each of the primary platforms when not pivoted toward each other. The transportable at least partial enclosure where the at least one side roof panel extendible support is joined to the associated lateral support.

A sixth general aspect includes the transportable at least partial enclosure of claim where the plurality of center section supports is configured to raise the center roof section to a position above the first and second walls and to lower the center roof section upon the first and second walls.

Implementations of the sixth aspect may include the following features. The transportable at least partial enclosure where each of the at least one supports for the side roof panels is configured to raise the associated side roof panel to a position above the first and second walls and to lower the center roof section upon the first and second walls.

A seventh general aspect includes a transportable fold-out at least partial enclosure including: a center stationary section; a pair of primary platforms including a first primary platform pivotally joined to the center stationary section and a second primary platform pivotally joined to the center stationary section on a side opposite the first primary platform, where the first and second primary platforms are pivotable toward and away from a storage position where outer portions thereof are disposed above the center stationary section and where a covering panel connected to the first primary platform and extending along a length of first primary platform from a first end to a second end is disposed above the center stationary section and extends toward the outer portion of second primary platform in the storage position; and at least one wall assembly pivotally joined to the center stationary section and each of the primary platforms to pivot from a first position where the wall assembly lies upon the primary platforms and the center stationary section and a second position where the wall assembly is pivoted away from the center stationary section and each of the primary platforms, the at least one wall assembly including a center panel pivotally joined to the center stationary section and a first side panel pivotally joined to the center panel and pivotally joined to the first primary platform and a second side panel pivotally joined to the center panel and pivotally joined to the second primary platform.

An eighth general aspect includes a transportable at least partial enclosure including: a platform having a storage space below an upper surface; a component received in the storage space; a support arm pivotally joined to the component and to the platform, the support arm of length to guide the component from a first position in the storage space to a second position on the upper surface.

Implementations of the seventh and eighth aspects may include one or more of the following features. The transportable at least partial enclosure and further including a second support arm pivotally joined to the component on a side opposite the support arm. The transportable at least partial enclosure where the support arm(s) are extendible. The transportable at least partial enclosure where the platform includes a cover, the cover covering the component in the first position. The transportable at least partial enclosure where the platform or the cover includes a recess for each of the support arm through which the arms extend when the component is in the second position and the cover covers the space. The transportable at least partial enclosure where the component has an upwardly facing surface in the second position and where the upwardly facing surface faces upwardly in the first position. The transportable at least partial enclosure where the component has an upwardly facing surface in the second position and where the upwardly facing surface faces a direction different than upwardly in the first position. The transportable at least partial enclosure where the component has a height dimension in the second position longer than a depth of the storage space. The transportable at least partial enclosure where the component includes a cabinet. The transportable at least partial enclosure where the component includes a refrigerator or cooler. The transportable at least partial enclosure where the component includes a toilet. The transportable at least partial enclosure where the component includes a heater or air conditioner. The transportable at least partial enclosure where the component includes a sink. The transportable at least partial enclosure where the component includes a cabinet. The transportable at least partial enclosure and further including: a first wall joined to the platform, a second wall joined to the platform spaced apart from the first wall. The transportable at least partial enclosure may also include a roof structure or canopy joined to the first and second walls. The transportable at least partial enclosure where each of the first wall and the second wall are pivotally joined to the platform where the first wall is configured to pivot from and to an extended position where each wall is substantially orthogonal to the platform. The transportable at least partial enclosure where the first wall is configured to pivot to and from the extended position of the first wall to a first wall lowered position adjacent the platform and where the second wall is configured to pivot to and from the extended position of the second wall to a second lowered position over the first wall. The transportable at least partial enclosure where the platform includes a stationary center section and a first primary platform pivotally joined to the stationary center section and a second primary platform pivotally joined to the center section on a side opposite the first primary platform, the first side roof panel being disposed above the first primary platform and the second side roof panel being disposed above the second primary platform, each of the first primary platform and the second primary platform being pivotal with respect to the stationary center section from a position over the center section to an extended position extending away from the center section. The transportable at least partial enclosure where each of the walls include a center panel pivotally joined to the center stationary section a first wall panel pivotally joined to the center panel and pivotally joined to first primary platform and a second wall panel pivotally joined to the center panel and pivotally joined to the second primary platform where the first and second primary platforms are pivotable toward and away from each other.

A ninth general aspect includes a transportable at least partial enclosure including: a stationary section; a primary platform pivotally joined to the stationary section; a lateral support extending outwardly from the stationary section, where the primary platform is supported by the lateral support; and a holding device including an actuator operably coupled to the lateral support and the primary platform to generate a force to hold the primary platform against the lateral support.

Implementations of the ninth aspect may include one or more of the following features. The transportable at least partial enclosure and further including: a second primary platform pivotally joined to the stationary section on a side opposite the primary platform; a second lateral extending outwardly from the stationary section, where the second primary platform is supported by the second lateral support; and a second holding device including a clamp operably coupled to the second lateral support and the second primary platform to generate a force to hold the second primary platform against the second lateral support. The transportable at least partial enclosure where the each of the lateral supports include a ground support holding an end of the corresponding lateral support relative to the ground. The transportable at least partial enclosure where the holding device is releasably couplable to the primary platform. The transportable at least partial enclosure where the holding device includes a lever arm. The transportable at least partial enclosure where the actuator includes threadably mating elements.

Implementations of any of the aforementioned general aspects can include features of implantations of any of the other general aspects.

BRIEF DESCRIPTION OF THE DRAWINGS

FIG. 1 is a partial exploded, perspective view of an embodiment of an enclosure.

FIG. 1A is a schematic sectional view of the enclosure of FIG. 1 taken along lines 1A-1A.

FIG. 2 is a perspective view of the enclosure of FIG. 1 unfolding.

DETAILED DESCRIPTION OF ILLUSTRATIVE EMBODIMENTS

Aspects of the invention will be described with respect to a fold-out transportable partial or complete enclosure that in one embodiment is particularly advantageously used as a camper such as but not limited to be mounted to a pickup or trailer. However, it should be understood that such a fold-out camper is but one embodiment where aspects of the invention can be incorporated on other folding or expanding transportable partial or complete enclosures, or on other forms of enclosures that are not necessarily used for camping or even on equipment that is generally pulled by another vehicle or device. Likewise aspects of the invention can be used as a fold-out partial or complete enclosure mounted to other vehicles such as a truck, such as a truck that does not have a pickup box but where the fold-out transportable partial or complete enclosure is mounted on a flat deck of or integrated as part of the truck and secured to the frame in a manner similar to self-propelled campers currently available. The fold-out transportable partial (not having one or more walls and/or roof or complete roof) or complete enclosure can also be mounted to or integrated in a boat or merely carried by vehicles or trailers and when deployed is deployed away from the transport vehicle or trailer.

Aspects of the enclosure herein referred to as a "camper" will be described with respect to fold-out camper 10 in one embodiment, illustrated in FIGS. 1-6; however, it should be understood that camper 10 is but one embodiment where aspects of the invention can be incorporated on other transportable partial or complete enclosures.

Camper 10 has some features also present in the trailer described in U.S. Pat. No. 7,967,369, U.S. Published Patent Application No. 2013/0154212 A1, and International Patent Application PCT/US2017/023251, filed Mar. 20, 2017 (designating the United States) and published as WO/2017/165314 on Sep. 28, 2017, the contents of which are all hereby incorporated by reference in their entirety.

Figure 3:
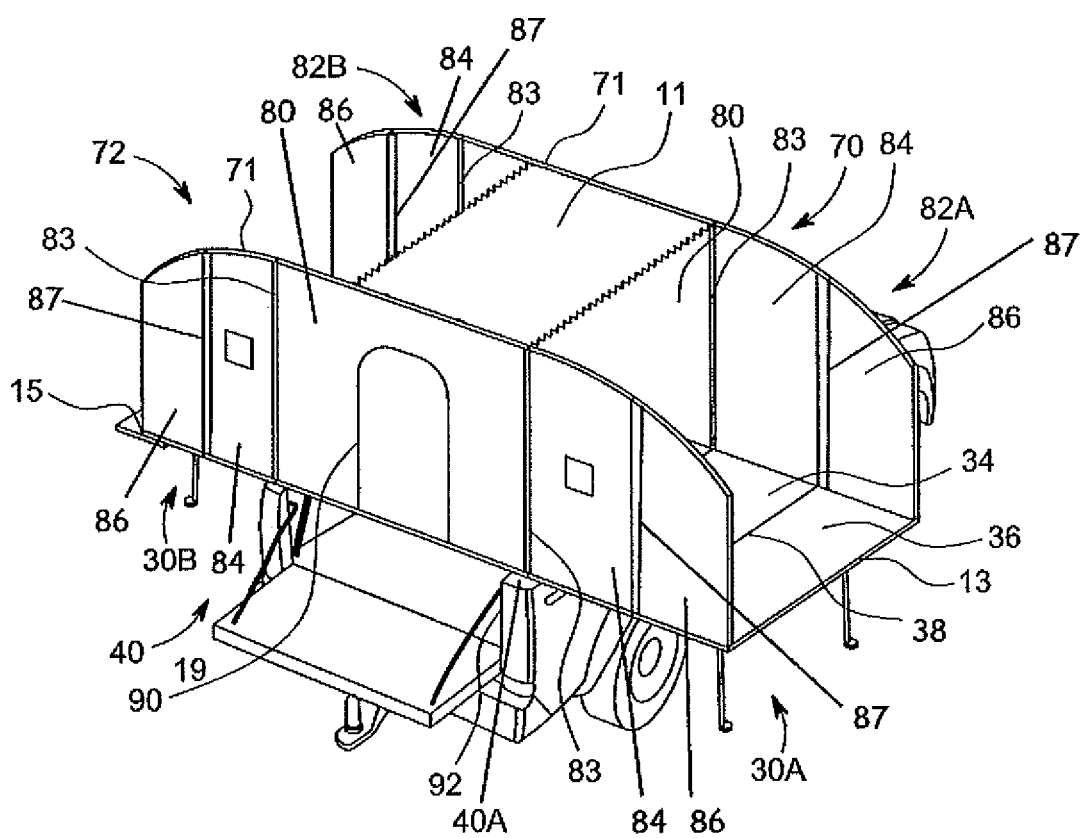
FIG. 3 is a perspective view of the enclosure of FIG. 1 in an extended position with portions removed.
Figure 4:
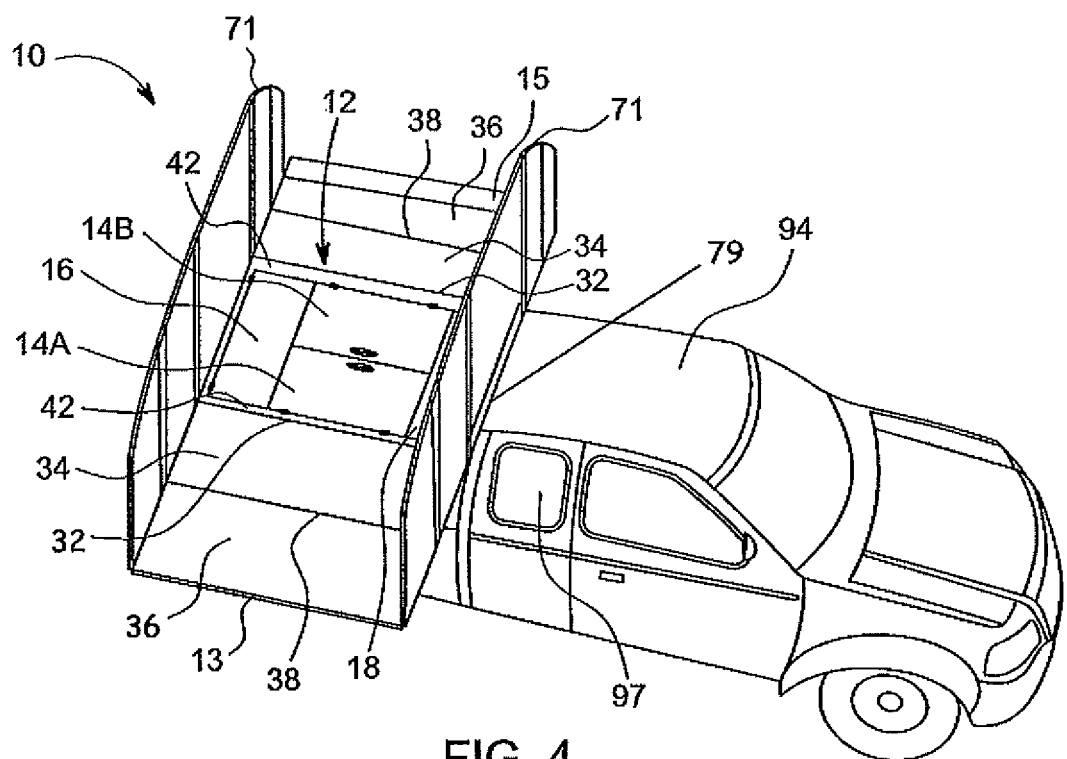
FIG. 4 is a perspective view of the enclosure of FIG. 1 with portions removed.
Figure 5:
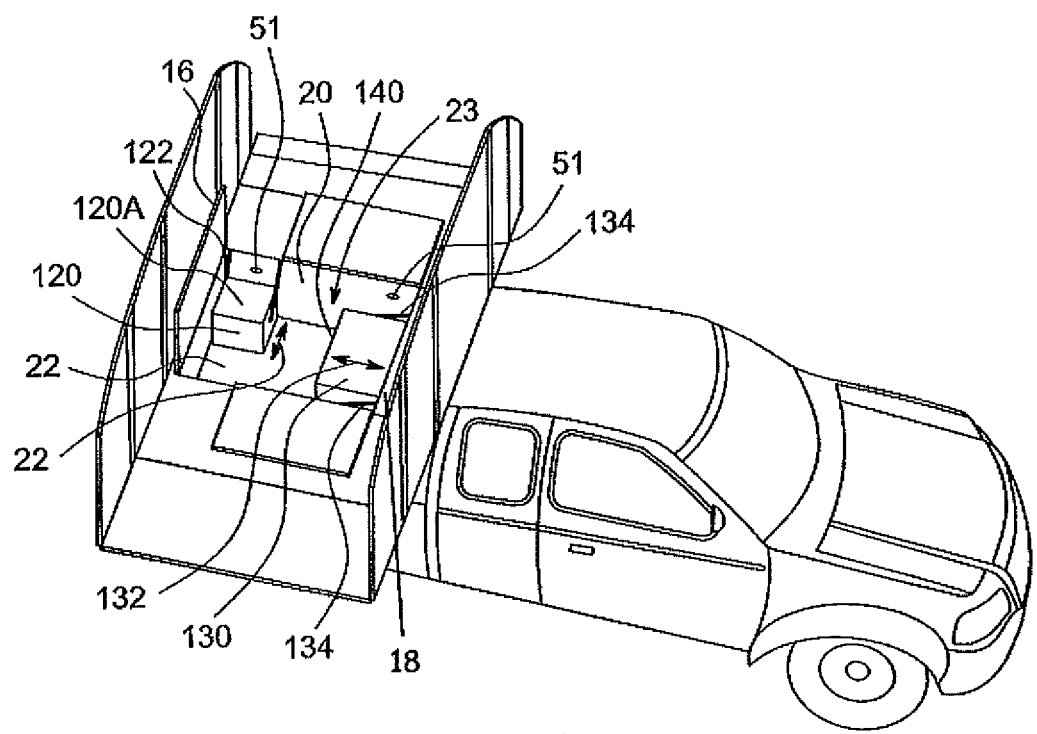
FIG. 5 is a perspective view of the enclosure of FIG. 1 with portions removed.

Generally, camper 10 includes a plurality of floor and wall panels that can be folded relative to each other to obtain a compact position illustrated in FIG. 1, while a second operative or a camping position is illustrated in FIG. 3 (with only a portion of a canopy 11). The camper 10 provides a very large enclosure with canopy 11 extending along the edges 71 of foldable walls assemblies 70, 72 from edge 13 to edge 15. The profile of the foldable wall assemblies 70,72 and in particular the configuration of the edges 71 are such that with the canopy 11 stretch across rain will shed to the sides. The profile illustrated in the figures should not be considered limiting, but rather are schematic to show the aspects of fold-out transportable partial or complete enclosure.

The camper 10 includes either a stationary panel assembly 12 that can be formed of a single panel, multiple panels or a panel assembly having removable or movable doors, such as indicated at 14a, 14b and 16. If desired, the panel assembly 12 can include one or more walls 20 and/or floor panels 22 (FIG. 5) to form either lower storage compartment(s) 23 or if one or more of the doors 14a, 14b or 16 are not present, an additional lower useable open space within the camper 10. Hence, in such a configuration, the camper 10 has two horizontal levels, a first being the floor 22 of lower portion 23 and the second level being the floors provided by platforms 30A, 30B mentioned below. Hereinafter, it should be understood that the stationary assembly 12 can take any of the forms described above when reference is made below.

Two primary folding platforms 30A and 30B are pivotally joined to outside edges 32 of the stationary panel assembly 12. In this embodiment, each primary folding platform 30A, 30B is formed from at least two pivotally connected panels 34 and 36 where panel 34 is pivotally joined to an associated outside edge 32 of stationary panel assembly 12, while an opposite edge 38 of panel 34 is pivotally joined to an inner edge of panel 36.

Stationary panel assembly 12 is mounted in, on or to vehicle, herein depicted as a pickup box bed 40, depending upon the structure of the stationary panel assembly 12. For example, if the stationary panel assembly 12 includes inner walls 20 and, if desired, floor 22, these walls 20 and floor 22 are located between inner fender walls that are present in most standard pickup boxes. In such a configuration, the stationary panel assembly 12 will typically include smaller side panels 42 that are joined or extend over upper edges of walls 20, each panel 42 extending toward the side edge of the pickup box 40. In another embodiment, the stationary panel assembly 12 can comprise a single panel of length and width to extend from one side rail 40A to the other side rail 40A of pickup box 40 (or extend beyond the side rails 40A of the pickup box 40). In short, the stationary panel assembly 12 can have any width as desired.

Various techniques can be used to secure the camper 10 to the pickup box 40. FIGS. 1-3 illustrate a tie down strap 19, which can be used between the stationary panel assembly 12 and a ring (not shown) secured to the pickup box 40. Typically, a strap 19 would be used in each corner of the pickup box 40. Access doors can be provided in the stationary panel assembly 12 as needed to allow access to the straps 40. In another embodiment, the camper 10 may be secured with fasteners such as bolts directly connected to the pickup box 40, or to the frame of the vehicle if a box is not present.

In view that each of the primary platforms 30A and 30B extend in an unfolded position outwardly from the pickup box 40, extendable and/or removable supports 50 are typically provided. Commonly, two lateral supports 50 are provided for each of the primary platforms 30A and 30B in an extended position. Each of the supports 50 extends from the stationary panel assembly 12 outwardly and under each of the primary platforms 30A and 30B. Remote ground supports 53 are typically provided to support the remote ends of supports 50. In an advantageous embodiment, the supports 50 can slide inwardly from the extended position so as to be fully within the width of the pickup box 40. If the stationary panel assembly 12 comprises a single panel, the extendable lateral supports 50 can slide underneath the stationary panel assembly 12. If on the other hand, the stationary panel assembly 12 includes walls 20, suitable apertures 51 (FIG. 5) are provided in the walls 20 such that the extendable supports 50 can be slid into the space defined by the opposed inner walls 20. In either of these embodiments, the stationary panel assembly 21 may be configured to provide openings above the side rails 40A of the pickup box 40 for the lateral supports 50 to extend there through, while portions of the stationary panel assembly 12 adjacent the openings contact the side rails 40 to provide support for the stationary panel assembly 12 on the pickup box 40.

In yet another embodiment, the lateral supports 50 can be separate parts that are inserted into suitable receivers of the stationary panel assembly 12 from outside of the pickup box 40 prior to the primary platforms 30A and 30B being unfolded. In yet another embodiment ground supports 53 can be used without lateral supports 50, the ground supports 53 being secured to the platforms 30A, 30B directly.

The camper 10 includes at least one and, preferably two wall assemblies 70 and 72. Each wall assembly 70 and 72 comprises a plurality of panels connected with hinges or other devices allowing the panels to pivot relative to each other. The wall assembly 70 and 72 form at least partial rigid sides or end walls to the camper 10 when the camper 10 is in an extended position. Referring first to wall assembly 70, the wall assembly 70 comprises a center panel 80 with side panel assemblies 82A and 82B pivotally joined to opposite sides of the center panel 80. Like the primary platforms 30A and 30B, each of the side panel assemblies 82A and 82B can comprise a panel 84 and a panel 86 that are pivotally joined together alongside edges indicated by hinge 87. In one embodiment, panels 84 and 86 are connected along edges with a continuous hinge, although if desired, separate spaced apart hinges can be used. Each of panels 84 are connected to middle panel 80 also with a hinge-type device 83. A particularly useful hinge is made of a flexible material such as a sheet of material secured along each of the panels 80 and 84 and extending therebetween. Preferably, a second sheet of flexible material is joined to the panels 80 and 84 on an opposite side of the first flexible material. Opposite edges of the panels 80 and 84 are spaced apart from each other allowing the flexible material (e.g. sheets) to extend therebetween and cover the associated gap between panels 80 and 84. If desired, hinge 87 can be similarly constructed with fabric material as hinge 83. This type of hinge construction is described in U.S. Pat. No. 7,967,369 and/or U.S. Published Patent Application No. 2013/0154212 A1.

In yet a further embodiment panel 84 not a rigid panel but rather is at least one flexible material joined to panel 80 and panel 86. If desired, the flexible material forming panel 84 is formed of a single unitary body with hinge 83 and 87. In yet a further embodiment, two sheets of flexible material spaced apart from each other can be used, typically being substantially planar with the major surfaces of panel 80 and panel 86 to which they are connected when the wall assembly 70 is erected, so as to trap air and thereby provide insulation between the two sheets of flexible material.

Each of the panels 80, 84 (if provided as a rigid panel) and 86 are pivotal relative to the associated panels comprising the floor of the camper 10 that being stationary panel assembly 12, panels 34 and panels 36, respectively, being connected with suitable hinges. This allows the wall assembly 70 to lie above the stationary panel assembly 12 and primary platforms 30A and 30B when the primary platforms 30A and 30B are in various configurations such as the travel position of FIG. 1 and as illustrated in FIG. 2.

Wall assembly 72 is constructed in a manner similar to that described with respect to wall assembly 70 where similar components have been identified with the same reference numbers. Wall assembly 72 can comprise a door 90.

If the panel assembly 12 is a single solid panel or a plurality of doors covering the storage area provided by walls 20, the door 90 can be of sufficient height to allow easy entry therethrough. If however, stationary panel assembly 12 has an open area defined by walls 20 and floor 22, an end panel (not shown) for the end of the box 42 at 92 may include a partial or portion of a door that can be connected, if desired, to a remaining portion represented by door 90 to form a larger complete door that can allow easy entry into and out of the camper 10. This concept is also illustrated in the next embodiment.

The wall assemblies 70 and 72 lie upon each other and together upon the stationary panel assembly 12 and the primary platforms 30A and 30B in the travel position of FIG. 1 and in a still folded position of FIG. 2. In one embodiment, wall assembly 72 lies upon stationary panel assemblies 12 and primary platforms 30A and 30B, while wall assembly 70 lies upon wall assembly 72. In view of the thickness of each of the panels forming wall assembly 72, stepped up hinges can be provided between the panels of wall assembly 70 and the stationary section assembly 12 and the primary platforms 30A and 30B, such that the wall assembly 70 lies flat upon the wall assembly 72. This hinge construction is described in U.S. Pat. No. 7,967,369 and/or U.S. Published Patent Application No. 2013/0154212 A1.

In the embodiment illustrated, wall assembly 70 can be secured to a support plate 79 located behind the cab of the pickup (FIG. 1) with a suitable fastener such as a catch (not shown). With the wall assembly 70 secured to support plate 79, or otherwise held erect, the wall assembly 72 can then be raised such that the canopy 11 extends between the wall assemblies 70,72 herein to form a roof and side walls. Lift assist mechanism for unfolding and folding the platforms 30A, 30B and the wall assemblies 70, 72 are disclosed in International Patent Application PCT/US2017/023251, filed Mar. 20, 2017 (designating the United States) and published as WO/2017/165314 on Sep. 28, 2017, the contents of which is hereby incorporated by reference in its entirety. Typically, spreaders (not shown) are used between the wall assemblies 70,72 such that wall assembly 72 is supported in an upright position and the canopy 11 is maintained in a taut position.

In order to obtain the travel position of FIG. 1 such as from the position of FIG. 2, with the wall assemblies 70 and 72 lying upon the stationary section assembly 12 and primary platforms 30A and 30B, and the primary platforms 30A and 30B can be folded upwardly (FIG. 2), such that each of panels 34 form an outside upwardly extending surface from the box 40 of the pickup and panels 36 extend inwardly towards each other to form at least partial a roof or cover in the folded, travel position (FIG. 1). If desired, an overlapping panel 100 can be attached to or extend from one of the panels 36, herein panel 36 of primary platform 30B, so as to extend along a length thereof and when the panels 36 are folded up and extend towards each other. Panel 100 covers any gap between the panels 36. The width of panels 34 in effect determines at least in part the height of the camper 10 in the completely folded travel position of FIG. 1 on or above the pickup box 40 and can be of any desired width such that the camper 10 in the folded travel position is at any desired height relative to the roof 94 of the cab of the pickup.

Suitable latches, clasps, clamps, fasteners, etc. one of which is schematically indicated at 37 on the end join the panels 36 together. Other locations for the include on the top latches, clasps, clamps, fasteners, etc.

Optionally, the ends of panels 36 can be configured to mate with each other in order to align the surfaces of each, for example, such that major surfaces 36A are substantially parallel to each other. Referring to the schematic illustration of FIG. 1A, where a portion of the abutting panels 36 are shown (with the plate 100 removed), for instance, one of the panels 36 can have a receiver 39A formed from spaced apart plates along part of or the entire length of the panel 36, while the other panel 36 has an end 39B that extends into the receiver 39A in the transport position. The opposed edges of panels 36 can be configured such that the panels 36 align longitudinally with each other so that end surfaces 36C are substantially aligned with each other. Various types of fasteners such as locking pins, clasps, latches or the like can be used to secure the panels 36 together. In yet a further embodiment, one or more sets of magnetically attracted elements can be provided on the panels 36 so that the panels align with each other in the transport position. In one embodiment, two magnets 41A, 41B are provided in each set (the sets being spaced apart from each other along the length of the panels 36), one on each of the panels 36. The set(s) of magnets 41A, 41B help obtain and/or maintain alignment of the panels 36 when brought together. Using two or more sets of spaced apart magnets 41A, 41B can be particularly advantageous in obtaining and/or maintaining alignment of the panels 36. In another embodiment, the magnets are not provided on each panel but rather magnet(s) attracted to a metal such as steel is provided. In this embodiment, the platform 30A, 30B or at least portions proximate the metal attracted to the magnet can be non-magnetic such as but not limited to being made of aluminum such that when the panels 36 are brought close to each other, the magnet(s) will align with the magnetically attractive metal so as to cause the panels 36 to align with each other.

In one particularly advantageous embodiment, each of the panels 34 approximates the height of the cab roof 94 of the pickup so that the panels 36 are approximately at the same level as the cab roof 94; however, this should not be considered limiting. Whether or not the width of each of the panels 34 approximates the height of the cab roof 94 of the pickup, each of the widths of panel 36 can be selected so as together to be slightly narrower than the width of the stationary panel assembly 12, such that in the folded travel position, each of the panels 34 are inclined inwardly towards each other so as to approximate the shape and/or inclination of the cab of the pickup such as the windows 97 and/or other components supporting the roof 94.

At this point it should be noted that in one embodiment the canopy 11 can remain connected to the wall assemblies 70 and 72 when the wall assemblies 70 and 72 are folded upon each other such that the canopy 11 also gets folded up in the travel position (similar to that described in U.S. Pat. No. 7,967,369, U.S. Published Patent Application No. 2013/0154212 A1) and International Patent Application WO/2017/165314.

If desired, various support structures (extending supports, poles, flanges, etc.) can be included for example within space 99 (FIG. 1) between stationary section assembly 12 and panels 36 to help support the folded panels of the camper 10 in the folded, travel position. For instance, flange supports 102 can be attached to end surfaces of the panels where the flanges 102 and the connections made with the panels help maintain the angle of the panels relative to each other in the folded, travel position. Other forms of support structures can include frame supports located between the stationary panel assembly 12 and the panels 34 and/or 36 in the folded, travel position. In one embodiment, the frame supports can extend along the length of the panels 34, 36 from an end proximate the tailgate area 47 of the pickup and to the support plate 79.

If desired, a removable panel 105 can cover the edges of the stationary panel assembly 12 and the edges of the panels 34 and 36 in the folded, travel position and thus enclose the space 99. Suitable latches, clasps, etc. can be used to connect removable panel 105 to the folded panels or to elements connected thereto such as flanges 102 in the folded, travel position.

Figure 6:
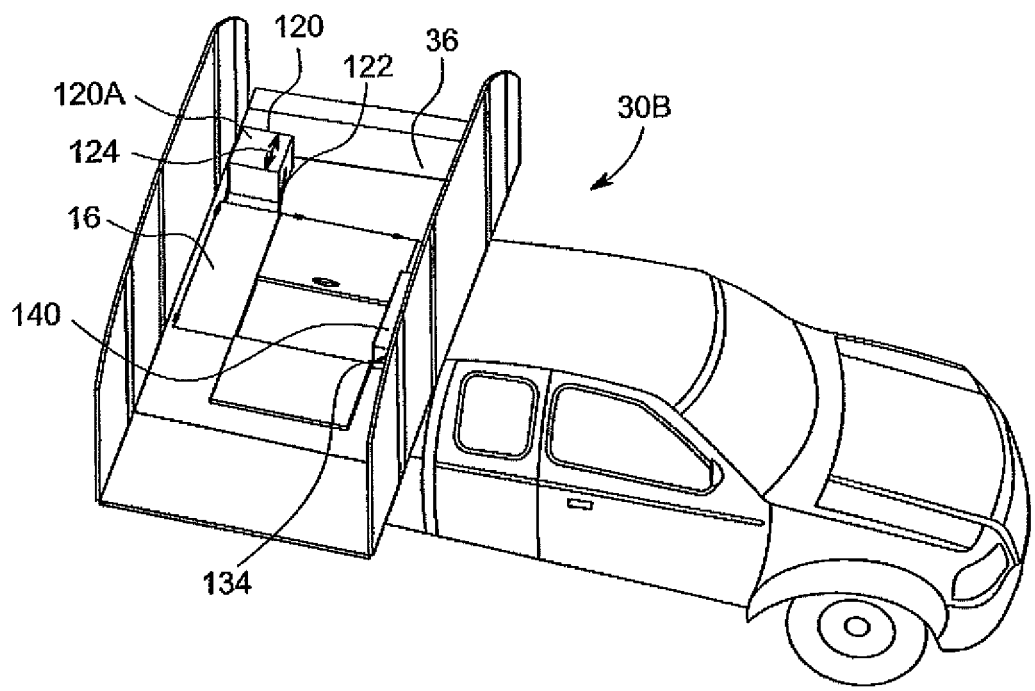
FIG. 6 is a perspective view of the enclosure of FIG. 1 with portions removed.

As indicated above, the stationary panel assembly 12 can include one or more doors 14A, 14B and/or 16, so as to cover selected areas of lower storage area or compartment(s) 23. In one embodiment, various types of objects, such as coolers, heaters, shower pans, toilets or cabinets can be stored in the storage area 23 defined by walls 20, and if present, floor 22. In one embodiment, lifting aids comprising pivotally connected support bars or arms are joined to, for example, walls 20 or other components of stationary section assembly 12 and extend between such portions of the stationary panel assembly 12 and are pivotally connected to the structures, articles, components, etc. within the storage area 23. Referring first to component 120 (which can be a cooler, heater, refrigerator, shower pan, toilet or cabinet, etc.), by way of example, pivotally connected support bars 122 extend from the stationary panel assembly 12 and are joined to component 120. In a preferred embodiment, a pivoting support bar or arm 122 is provided on each of a pair of opposite sides of the component 120. The pivoting support arm(s) 122 guide the component 120 when lifted upwardly along a predetermined arcuate path defined by the pivoting motion and length of the support arms 122. In this manner, the user need not struggle with the component 120 twisting or shifting laterally because the pivoting support arms 122 guide the component 120 along the arcuate path from and to the storage area 23. As illustrated in FIG. 6, the arms 122 locate the component 120 on the stationary panel assembly 12 and/or the panel 34 of primary platform 30B when the component 120 is lifted out of the storage area 23. If desired, support arms 122 can also be adjustable in length such as to telescope to allow the component 120 to move to other lateral positions either closer to or away from the storage area 23. It should be noted that an upwardly facing surface 120A of the component 120 remains upwardly facing when the component 120 is disposed in or out of the storage area 23 and on the primary platform 30B. This can be particularly advantageous because the user need only provide a force to lift the component 120 so that any handle or the like, if desired, can be located on or proximate the upwardly facing surface 120A.

In a further embodiment, one or both of the support arms 122 can comprise a torsion spring such that the spring provides a force to help lift the component 120 out of the storage area 23, and if further desired to continue to provide a torque upon the arm 122 that tends to hold the component 120 against the stationary section assembly 12 and/or primary platform. Typically, the torque of the torsion spring is that which helps reduce the force needed by the user to lift component 120; however, if desired, the torque of the torsion spring can be greater than the weight of the component 120 such that the torsion spring alone can lift the component 120. In another embodiment, one or both of the support arms 122 can include a rotary actuator (pneumatic, hydraulic or electric) connected to a suitable pump or power source such that the user can selectively use the rotary actuator to lift and lower the component 120.

If desired, as illustrated in FIG. 6, the door 16 can be closed to again form a floor of the stationary section 12 after the component 120 has been lifted out of storage area 23. Suitable reliefs or apertures can be provided in door 16 to accommodate support arms 122 extending therethrough particularly when the door 16 is closed and the component 120 is outside of the storage area 23.

Typically, connection of the supporting arm(s) 122 is connected to the component 120 approximately at the middle of the width 124 of the component 120. In this manner, the component 120 is typically most easily balanced; however, the location of the pivoting connection to the component 120 of the support arm 122 should not be considered limiting. The height of the connection of the arms 122 to the side of the component 120 from the bottom edge of the component 120 can determine the lateral position of the component 120 when positioned outside of the storage area 23.

A second component 130 in the storage area exemplifies an article or structure having a height when the component 130 is placed in an upright position alongside the storage area 23 (FIG. 5) that exceeds a depth of the storage area 23. Stated another way, component 130 is rotated by 90° when stored because it is too tall to store in storage area 23 in an upright manner. Like component 120, one or more support arms 134 are provided connecting the stationary panel assembly 12 to the component 130. Comparing FIG. 5 to FIG. 6, the component 130 is guided from a position where the component 130 is lying down in storage area 23 and rotated 90° while being lifted so as to be placed in an upright, position adjacent wall assembly 70 and herein on door 18 (although door 18 is not mandatory and could simply comprise a solid panel of the stationary panel assembly 12). The support arms 134 connecting the component 130 to the stationary support assembly 12 are arranged such that the component 130 rotates 90° as it is lifted out of the storage area 23, such that a surface 140 of the component 130 being substantially orthogonal to the stationary panel assembly 12 and primary platforms 30A and 30B faces upwardly when the component 130 is disposed out of the storage area 23. The support arm(s) 134 are preferably located on sides of the component 130 and thus extend at an inclined angle toward wall assembly 70 and alongside the component 130 when the component 130 is moved to a position outside of the storage area 23. This arrangement of the support arms 134 on component 130, like the support arms 122 on component 120 can advantageously help restrain the components 120, 130 both in the storage area 23 and out of the storage area 23. If desired, one or both of the support arms 134 can include a torsion spring or rotary actuator as discussed above with respect to support arms 122.

A second embodiment of a camper particularly for but not exclusively used on a pickup is illustrated at 200 in FIGS. 7-10. Like the camper 10, camper 200 has a stationary section, folding primary platforms and folding wall assemblies. In camper 200 similar components to that described above have been indicated with reference numbers along with a prefix "2". For example, primary platforms 230A and 230B are similar to platforms 30A and 30B.

Like camper 10 described above, camper 200 includes a stationary section assembly 212 to which the primary platforms 230A and 230B are pivotally secured along edges 232. In this embodiment though, primary platforms 230A and 230B comprise a single panel 234 rather than being formed of panels like panels 34 and 36 in camper 10. Camper 200 includes wall assemblies 270 and 272. Each of the wall assemblies 270 and 272 comprise a single center panel 280 to which side panels 282A and 282B are pivotally secured on opposite edges of panel 280. Like primary platforms 230A and 230B, side panels 282A and 282B are also single panel structures rather than hinged panel structures like that described above in camper 10. Hinges or hinge devices comprising flexible material 283 joins the side panels 282A, 282B to the center panel 280.

Figure 8:
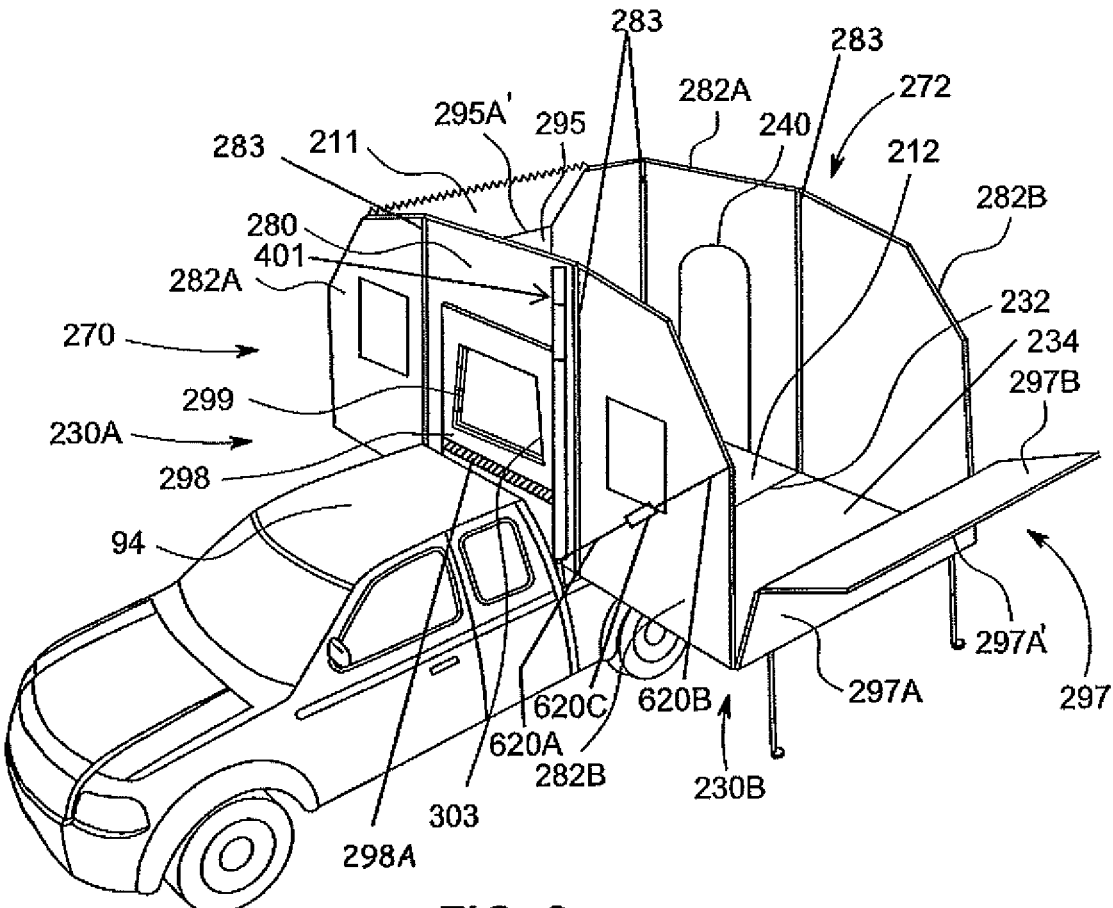
FIG. 8 is a perspective view of the enclosure of FIG. 7 in an extended position with portions removed.
Figure 11:
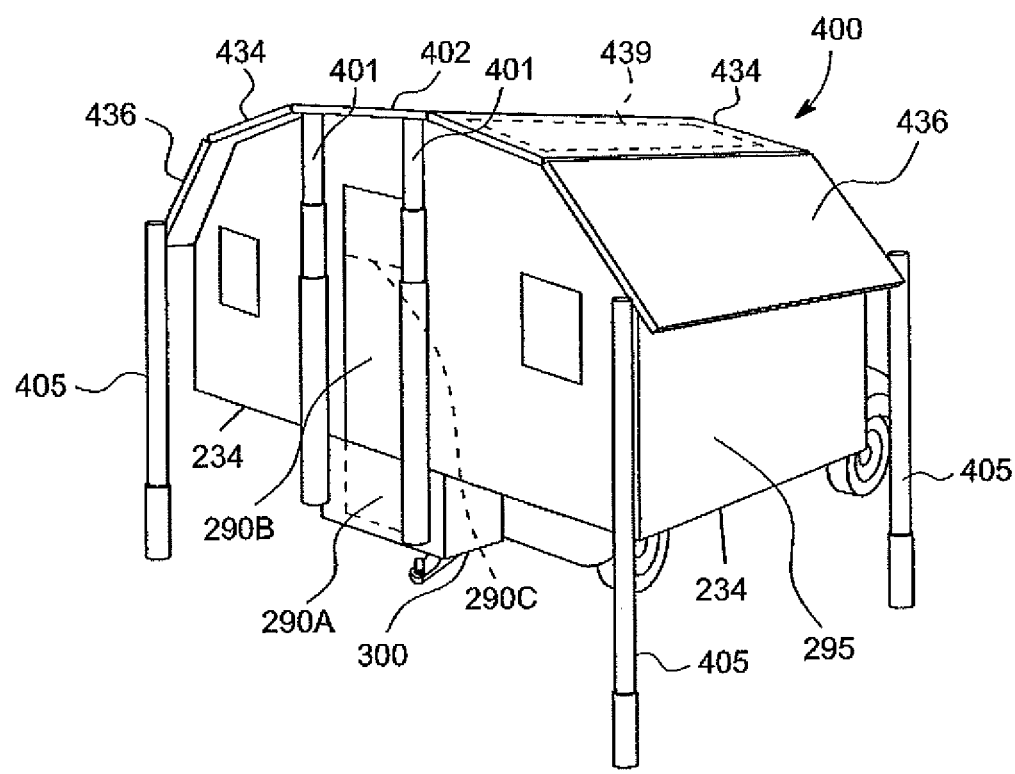
FIG. 11 is a rear-perspective view of the enclosure of FIG. 7 with the hard roof structure.

In a folded position, wall assembly 270 lies upon stationary section 212 and primary platforms 230A and 230B while wall assembly 272 lies upon wall assembly 270 similar to camper 10 above. However, unlike camper 10 described above, camper 200 further includes side walls 295 and 297. Each of these side walls 295, 297 are pivotally secured to an outermost edge 298 of primary platforms 230A and 230B. The side walls 295, 297 can be formed as one single panel or multiple, preferably, hinged panels. In the embodiment illustrated, it is shown that side wall 295 can comprise a single panel. In the embodiment of FIG. 8, the side wall 297 exemplifies how two panels 297A and 297B are pivotally joined together and can be folded upon each other. FIG. 11 illustrates side wall 295 as a single panel.

At this point it should be noted that in one embodiment a canopy 211 (a portion shown in FIG. 8) can span between the wall assemblies 270 and 272 being connected thereto in the general form of an arch while ends of the canopy 211 are securely but removably attached to the upper edges 295A', 297A' of the side walls 295 and 297 when the walls 295 and 297 are secured to side edges of the wall assemblies 270 and 272 with clasps, latches, straps, etc. Typically, the fabric material of the canopy 211 would be releasably secured to the upper edges 295A', 297A' of the side walls 295 and 297 for example, but not limited to, using snaps, zippers, hook and loop fasteners, straps and the like.

In an upright camping position or fully extended position, the canopy 211 extends between the wall assemblies 270 and 272 and can be secured to upper edges 295A', 297A' of the panels 295 and 297 in a weather tight manner forming a partial arched roof structure. In another embodiment, the canopy 211 can be configured to form a complete arched structure like canopy 11 of camper 10. In such an embodiment, the panels 295, 297 do not need to form a weather tight seal with the side edges of the wall assemblies 270, 272. Rather, the panels 295, 297 can be used to form an outer wall that protects the sides of the canopy 211 in the extended position. When used only as a protective wall for the sides of the canopy 211, it may be desirable to have a flap of canopy material extend over the upper edges 295A', 297A' of the panels 295 and 297 when erect so that water, snow or the like is shed over and down the outwardly facing surface of the panels 295, 297 rather than falling between the outwardly facing surface of the canopy 211 and an inwardly facing surface of the walls 295, 297.

Figure 9:
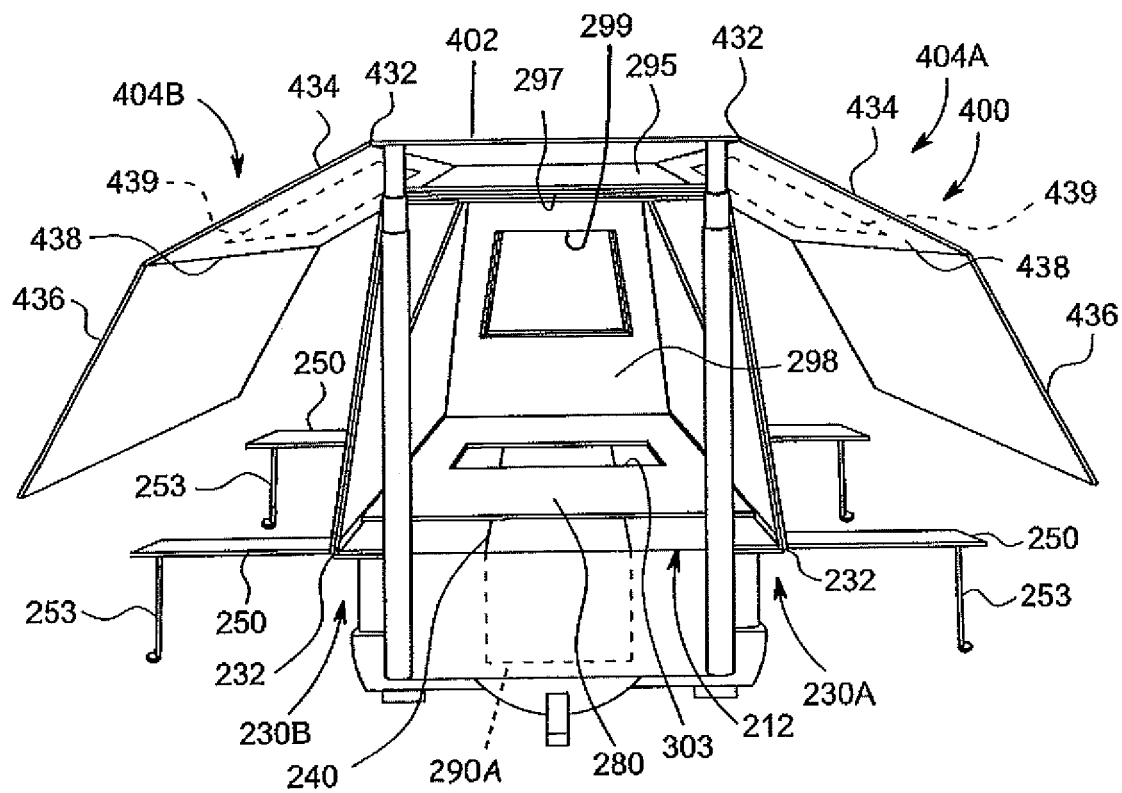
FIG. 9 is a rear-perspective view of the enclosure of FIG. 7 with a hard roof structure.

When it is desirable to fold up the camper 200 from the extended position, the edges of the canopy 211 (or the flap of material described above) secured to the panels 295 and 297 are released and each of the panels 295 and 297 is allowed to pivot outwardly and downwardly away from the side edges of the wall assemblies like wall 297 as illustrated in FIG. 8, possibly with the upper edges 295A', 297A' being supported on or proximate the ground. Wall assembly 272 having door 290 is then lowered upon the stationary panel assembly 212 and the primary platforms 230A and 230B. Wall assembly 270 is then lowered upon wall assembly 272. The canopy 211 can remain attached to the wall assemblies 270, 272. Each of platforms 230A and 230B are then lifted upwardly pivoting with respect to stationary panel assembly 212 along edges 232 so that the primary platforms 230A and 230B extend upwardly (FIG. 9). Since panels 295 and 297 are connected to the outermost edges of primary platforms 230A and 230B, these portions of the panels 295 and 297 are also lifted upwardly. Panels 295 and 297 can then be lifted upwardly and rotated in an overlapping manner so as to form a roof structure in the folded, travel position (FIG. 9).

It should be noted in this embodiment, a front wall or panel 298 (FIGS. 7 & 8) is provided and can be used to support wall assembly 270 in an upright position similar to wall assembly 70 being secured to support panel 79 in the previous embodiment. In one embodiment, the front wall 298 includes an aperture 299 allowing access to a compartment 321 (FIG. 7) above the roof 94 of the cab of the pickup. The compartment 321 extends above the roof 94 and includes a support floor 298A, shown with a dashed line in FIG. 7 and broken away in FIG. 8. Camper 200 thus has at least two horizontal levels when compartment 321 is present, a first level being within compartment 321 and a second being the floor of the platforms 230A, 230B. In another embodiment, camper 200 can be provided with a lower floor or storage compartment like camper 10, and hence in such an embodiment has three horizontal levels.

In a further advantageous embodiment, the middle panel 280 of wall assembly 270 includes an aperture 303 (FIG. 9) similar to the aperture 299 found in the front wall 298. In this manner, when the camper 200 is unfolded and in a camping position, users of the camper 200 can access the inside of the compartment 321 above the roof 94 of the cab from the inside of the camper 200 through aligned apertures 299 and 303 in front wall 298 and panel 280, respectively. However, it should be noted as illustrated in FIG. 9, aperture 299 provides access to the inside of compartment 321 when the platforms 230A, 230B and panels 295, 297 are folded. If desired, windows can be mounted in any of the wall assembly panels 282, 282B, 295 and 297.

Figure 10:
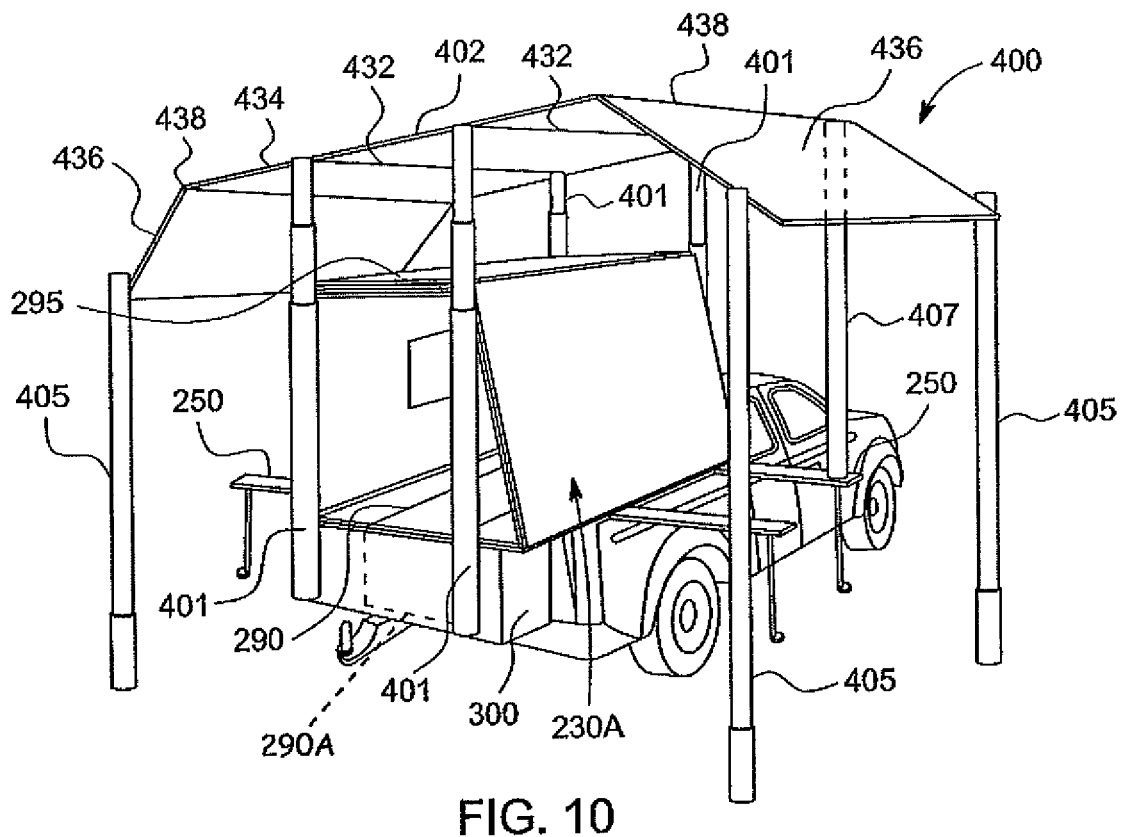
FIG. 10 is a rear-perspective view of the enclosure of FIG. 7 with the hard roof structure.

Like wall assembly 72 in camper 10 illustrated above, wall assembly 272 of camper 200 can include a door 290. Referring to FIGS. 9-11, the door 290 indicated with solid lines corresponds to a height of a door which would be used if stationary section assembly 212 comprised a panel structure that comprised one level on the side rails 40A of the box 40. However, camper 200 also shows an extension 300 which extends past the box 40 of the pickup (on top of the tailgate or with the tailgate removed). The extension 300 enables each of the primary platforms 230A and 230B, the side wall panels 295 and 297 as well as the length of each of the panels formed in the wall assemblies 270 and 272 to be longer than the standard length of the box 40 so as to provide a larger camper on the inside than that illustrated with camper 10 indicated above. It should be noted however though camper 10 could also include an extension similar to 300 (on top of the tailgate or with the tailgate removed) enabling all the panels thereof to be of longer length and provide thus a larger camper.

If the extension 300 is provided, the door 290 could include a lower portion 290A indicated with dashed lines with an upper portion 290B indicated by dashed line 290C (FIG. 11). The lower portion 290A can be configured to open separately allowing access into the bottom portion of the camper 200 in the folded, travel position. Typically, if door portions 290A and 290B are present, they would be connected together when wall assembly 272 is upright such that the door portions 290A and 290B open and close together.

In one embodiment as described above, the camper 200 can include the canopy 211 in which case when folded in a travel position the folded panels 230A, 230B, 295 and 297 are as illustrated in FIGS. 9 and 10. Like camper 10 above, the canopy 211 can remain attached to the wall assemblies 270, 272 in the folded travel position. The canopy 211 (a portion of which is illustrated in FIG. 8) extends between the wall assemblies 270,272 and side panels 295, 297 (if present) and/or is connected to the primary platforms 230A, 230B.

Figure 7:
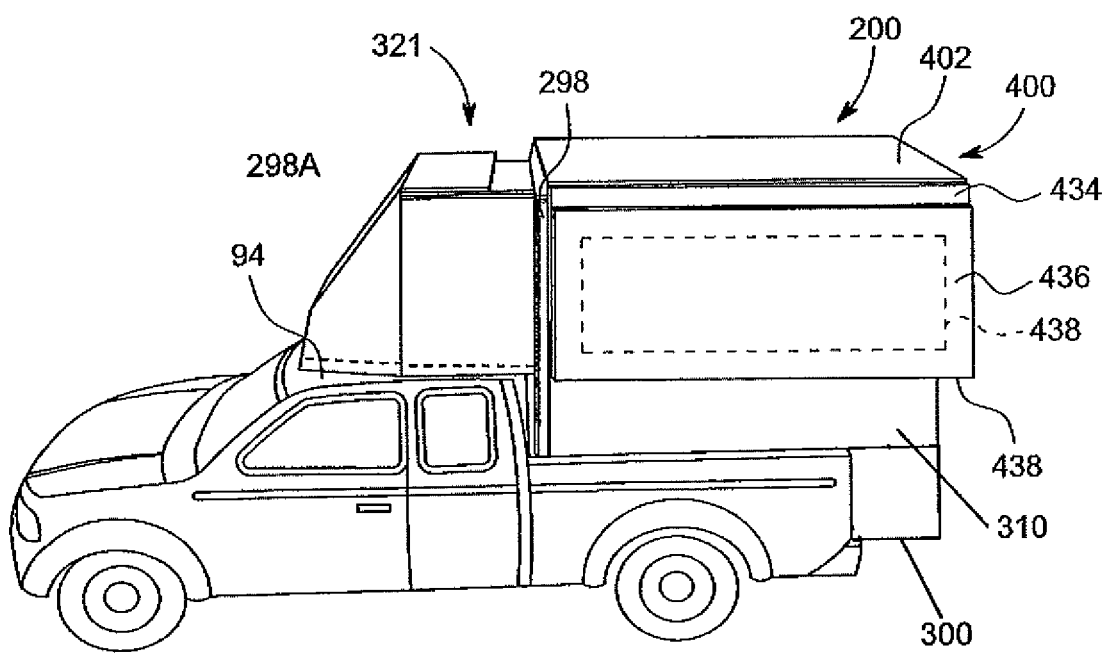
FIG. 7 is a perspective view of a second embodiment of an enclosure.

However, in another embodiment, the camper 200 can include a hard roof structure that can be used with, or be used in place of the canopy 211. The hard roof structure 400 is illustrated in FIGS. 7, 9 and 10. Referring to FIG. 9, the roof structure 400 includes a center panel 402 and side panels 404A and 404B. In a further embodiment, side panels 404A and 404B are formed from panels 434 and 436 where each of panels 434 and 436 are pivotally joined together along an edge 438 and panel 434 is pivotally joined to center panel 402 along an edge 432. By pivotally joining the panels 434 and 436 with suitable hinges or the like, panel 436 can be folded upon panel 434 when the camper 200 is in a folded, travel position as illustrated in FIG. 7.

The hard roof structure 400 can be easily deployed during setup of the camper 200. For example, extending (e.g. telescoping) supports 401 which can be manual or powered with suitable actuators or with cables that control extension and retraction are present and connected to panel 402 at both the front end of the camper near front wall 298, and at the back of the camper proximate the door 290 when it is in the upright position. Herein the front supports 401 are joined to the front wall 298 or otherwise supported by the pickup 40, while the back telescoping supports can be secured to the extension 300. In the folded, travel position the length of each of the supports 401 can correspond to the distance between the extension 300 and the roof structure 400 when the roof structure 400 (in particular panel 402) lies upon the overlapping panels 295 and 297.

When the camper 200 is to be deployed, the front and back supports 401 are extended upwardly to a position or height equal to or slightly above that of the roof structure 400 when the camper 200 is in use FIG. 11. The supports 401 can be powered through pulleys, cables, ballscrews, pneumatic or hydraulic actuated cylinders, etc. Such supports are commonly found in popup campers. The supports 401 are schematically illustrated and need not be as large as illustrated.

With the center roof panel 402 at a height equal to or slightly above that of the camper 200 when in use, side panels 404a and 404b are also supported upwardly using supports 405 on ends remote from the center panel 402. The supports 405 can take any number of forms. For instance, supports 405 can be separate telescoping poles supported if needed with stay lines, not shown. In the embodiment illustrated, the supports 405 extend from the ground to each corner of panels 404a and 404b. Like camper 10 described above, extendable supports 250 would be provided so as to support the primary platforms 230A and 230B in their unfolded position. Remote ground supports 253 are typically provided to support the remote ends of supports 250. In another embodiment ground supports 253 can be used without lateral supports 250 being connected directly to the platforms 230A, 230B. If desired, supports 407 (one of which is illustrated in FIG. 10) for holding roof panels 404a and 404b upwardly can be structurally connected to the supports 250 being used to support the primary platforms 230A and 230B such that the longer supports 405 illustrated in the figures extending from the ground surface to the panels 404a and 404b would not be needed. Preferably, the ends of the panels 404A and 404B are supported as illustrated in FIG. 10 so as to be at the height or slightly above the position of the panel 404A, 404B when the roof 400 is in use (FIG. 11).

The primary platforms 230A, 230B, wall assemblies 270,272 and side panels 295, 297 can be unfolded in a manner like that described above. In particular, the side panels 295 and 297 would be pulled away from each other as the primary platforms 230A and 230B are pivoted away from each other, remote edges of the side panels 295 and 297 can be placed on the ground while the primary platforms 230A and 230B are unfolded and while the wall assemblies 270 and 272 lie upon each other and on the stationary section 212 and primary platforms 230A and 230B. Each of the wall assemblies 270 and 272 can then be lifted into their upright positions, where wall assembly 270 is at least held against front support panel 298, and in one embodiment connected thereto. Extendable supports or spreaders between the wall assemblies 270, 272, not shown, but described in the U.S. Published Patent Application and the International Patent Application identified above hold the wall assemblies 270 and 272 upright. Each of the panels 295 and 297 can then be pivoted upwardly and secured to side edges of the wall assemblies 270 and 272. With the side walls 295 and 297 attached to the walls, the roof structure 400 can be lowered by lowering supports 401, 405 or 407 where the center roof section 402 is lowered upon the top edges of the wall assemblies 270 and 272 and while the side panels 404a and 404b (and panels 434 and 436), are also lowered upon the upper edges of the wall assemblies 270, 272 when the outer supports 405 or 407 are lowered.

Figure 15:
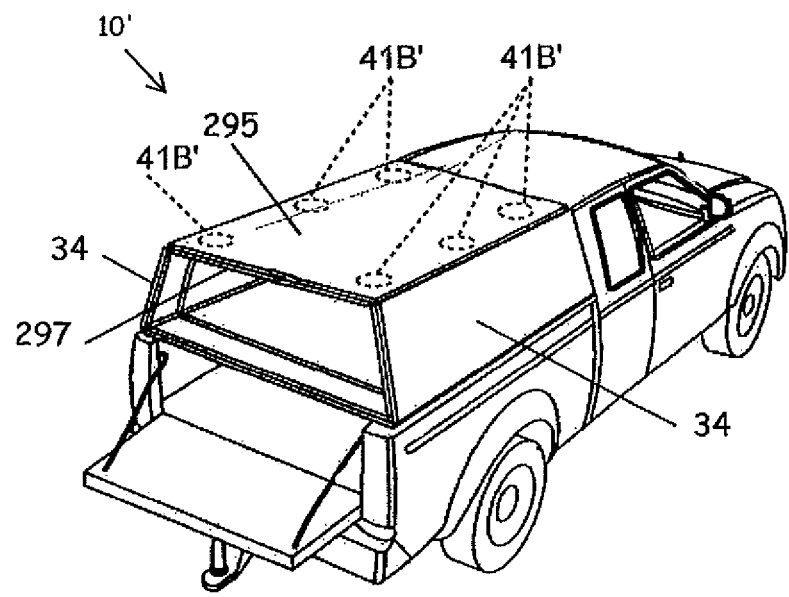
FIG. 15 is a perspective view of a fourth embodiment of an enclosure.
Figure 16:
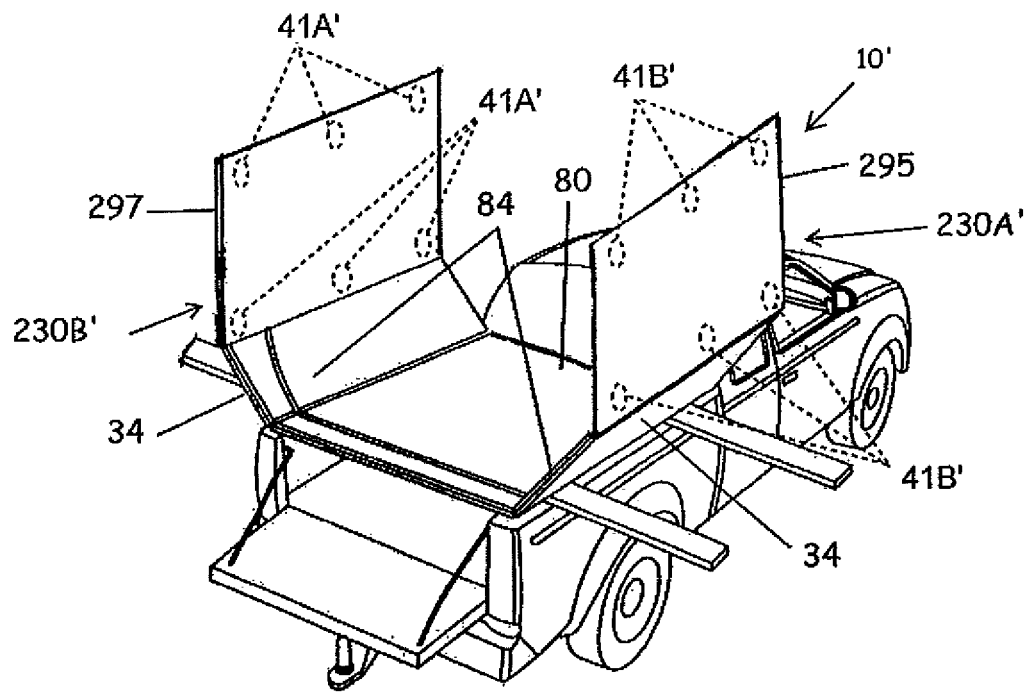
FIG. 16 is a perspective view of the enclosure of FIG. 15 unfolding.
Figure 17:
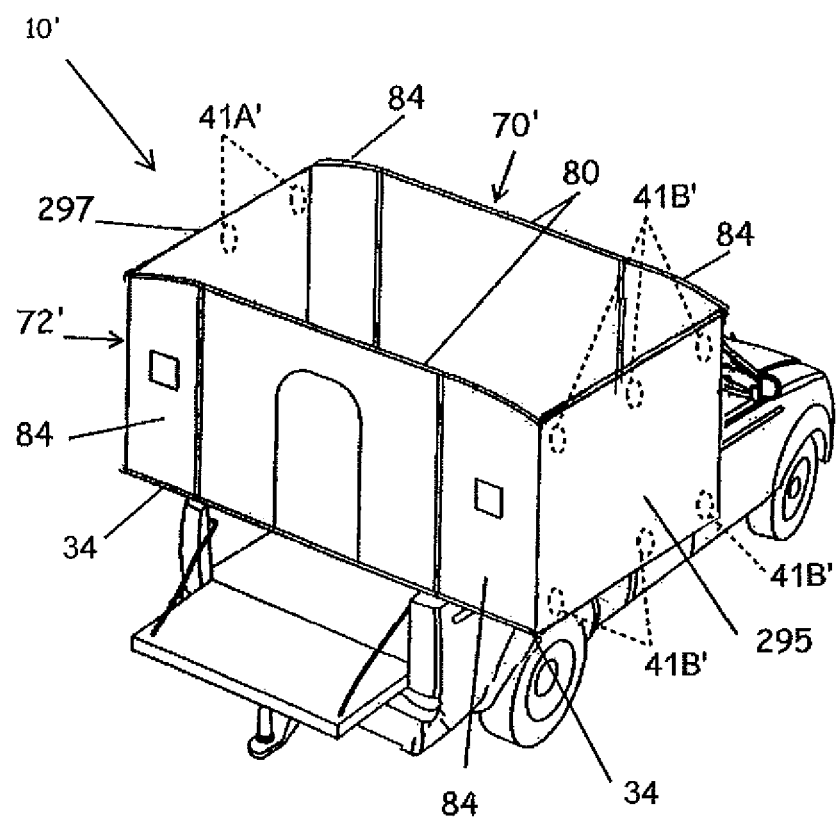
FIG. 17 is a perspective view of the fourth embodiment in an extended position with portions removed.

At this point it should be noted that the side panels 295, 297 can be provided with the first embodiment denoted in FIGS. 15-17 as 10'. Camper 10' is essentially the same as camper 10, but the platforms 230A', 230B' do not include panels 36. Likewise, the wall assemblies 70', 72' do not include panels 86. Hence camper 10' although having basically the same size in the travel position of FIG. 15 as camper 10, in the extended position, camper 10' is not as wide as camper 10. The canopy forming at least the roof is not shown. The canopy can be connected to panels 295, 297 in the alternative manners as described above with respect to camper 200 depending on whether or not the canopy is connected to the platforms 230A, 230B. Various types of fasteners such as locking pins, clasps, latches or the like can be used to secure the panels 295, 297 together. If desired, magnets 41A, 41B can be used to align panels 295, 297 with each other so as to maintain the camper 10' in the travel position. In one embodiment, a single set of magnets 41A', 41B' between panels 295, 297 can be used. In other embodiments, spaced apart sets of magnets 41A', 41B' can be provided. FIGS. 15-17 illustrates a first set of spaced apart magnets 41A', 41B' on one side of the camper 10' and an optional second set of spaced apart magnets 41A', 41B' on the other side of the camper 10'. Magnets 41A' are fixed to panel 297 and magnets 41B' are fixed to panel 295. In another embodiment, the magnets 41A and/or 41B on one of the panels can be aligned with magnetically attractive metal on the other panel as described above.

In yet another embodiment, sets of magnets 41A', 41B' are provided on each of the panels 295 and 297, where a magnet is provided on each of the panels so that the magnets 41A', 41B' on panel 295 align with the magnets on panel 297 in the travel position of FIG. 15. In yet still another embodiment, the magnets 41A', 41B' on one side of the camper 10' are oriented in a direction opposite to the magnets 41A', 41B' on the other side of the camper 10'. In other words, the magnets 41A', 41B' on the driver's or left side of the camper 10' are oriented with North facing up, while the magnets 41A', 41B' on the right side of the camper 10' are oriented with South facing up. This can be advantageous when the panels 295 and 297 are pulled away from each other from the travel position. As the panels 295, 297 are pulled away from each other the magnetic attraction tending to pull the panels 295, 297 toward each other reduces. Eventually the magnetic attraction is so small that the panels 295, 297 slide easily relative to each other as the panels are pulled away from each other. However, as the right edge of the panel 295 approaches the left edge of panel 297, the magnets on the panels 295, 297 can again come into alignment. If the magnets 41A', 41B' on the left side have the same orientation as the magnets 41A', 41B' on the right side, the magnets 41A', 41B' will attract to each other. This may be undesirable when it is desired to unfold the camper 10' from the travel position. However, if the magnets 41A', 41B' on the left side have an opposite orientation as the magnets 41A', 41B' on the right side, the magnets 41A', 41B' will repel each other, thus allowing the panels 295 and 297 to separate easily from each other.

In a further embodiment, the roof structure 400 (as well as the roof structure 600 described below) can include skylight windows in any of the roof panels. In FIGS. 7, 9 and 11, skylights 439 are shown mounted in panels 434. The location in panels 434 are particularly advantageous because in the travel position of FIG. 7, panels 436 overlap and protect the windows 439 during transport or storage.

Figure 12:
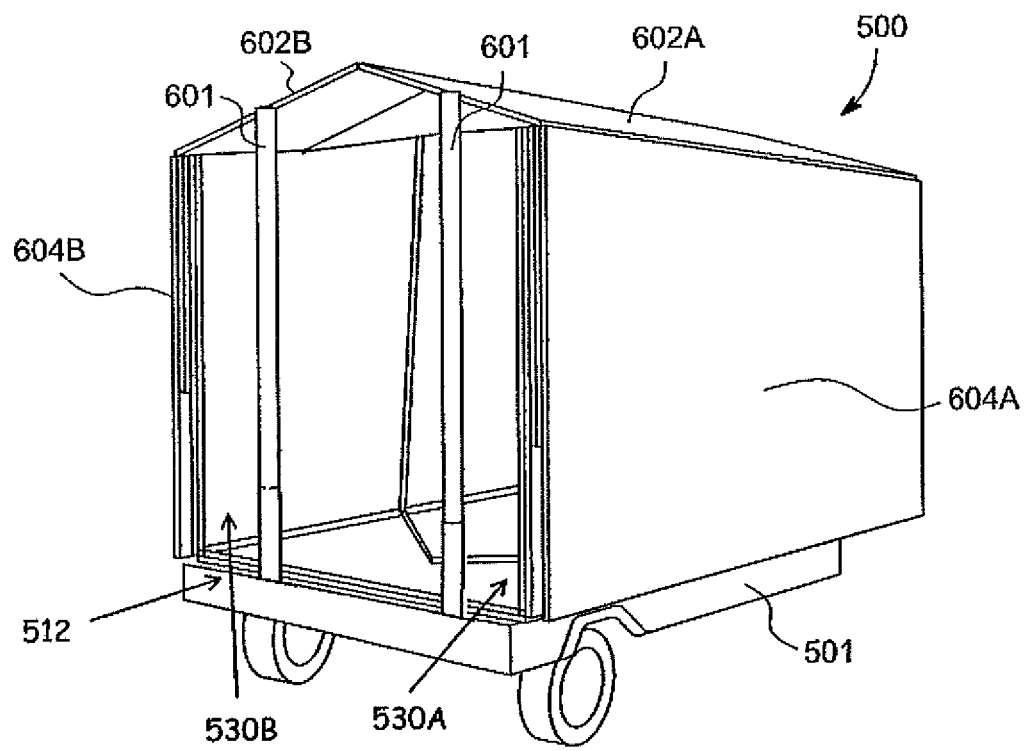
FIG. 12 is a rear-perspective view of a third embodiment of an enclosure with a hard roof structure.
Figure 13:
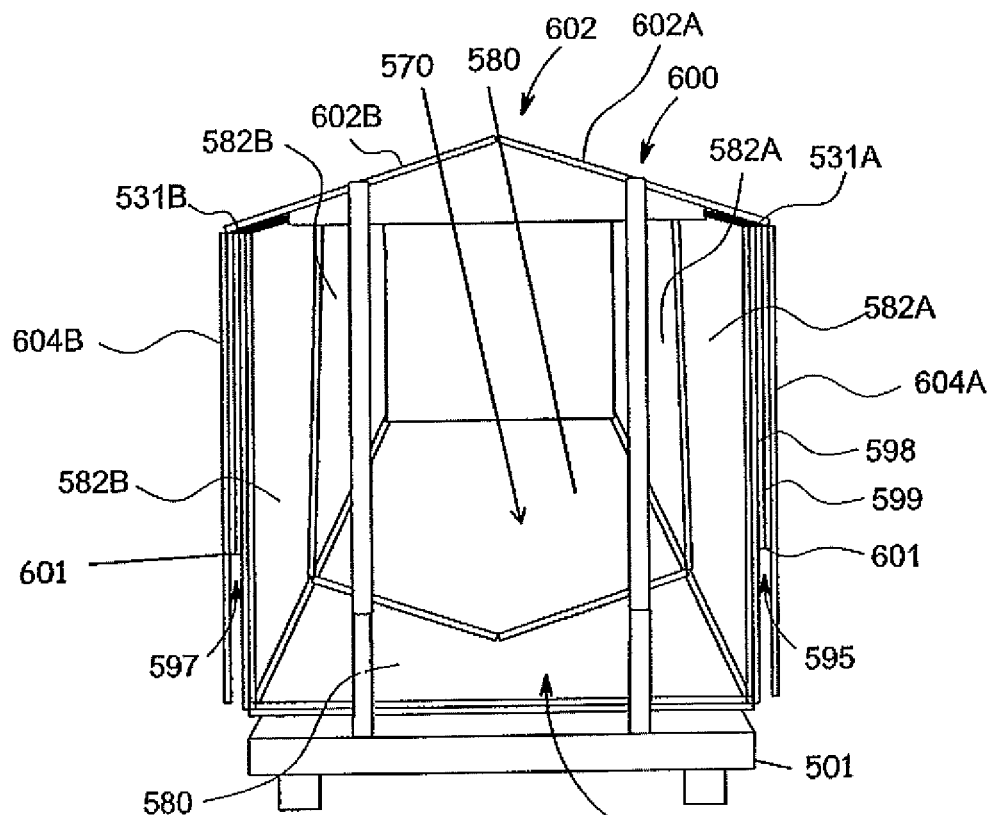
FIG. 13 is a rear-perspective view of the enclosure of FIG. 12.
Figure 14:
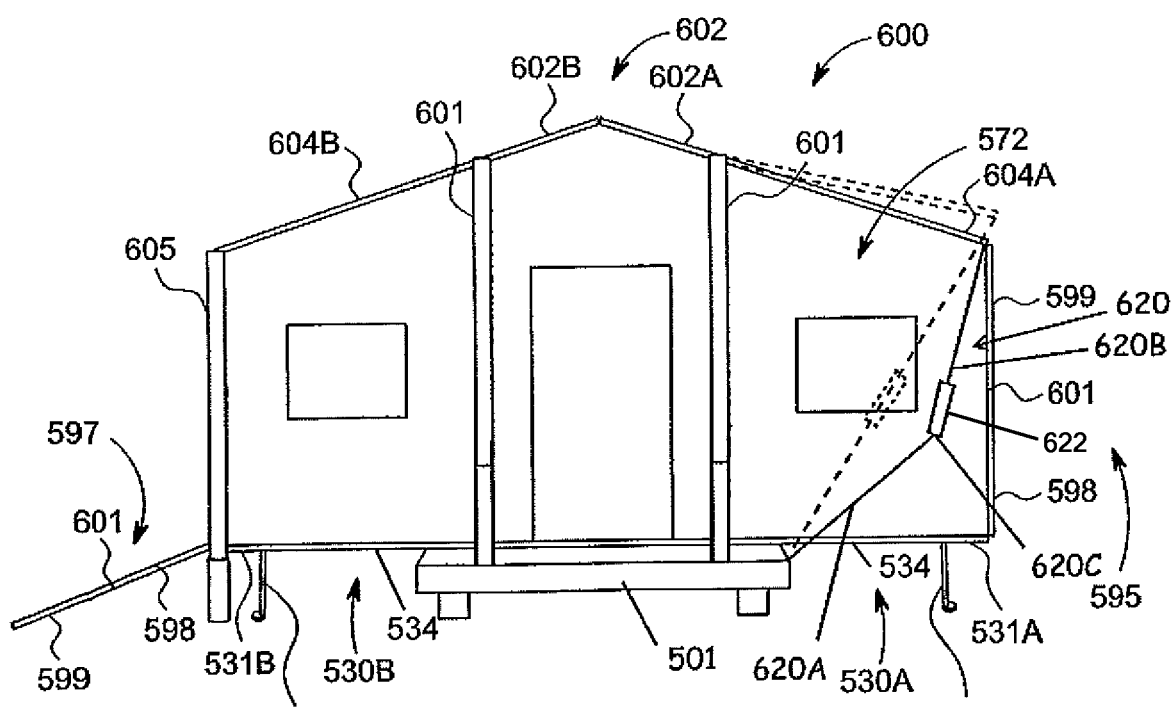
FIG. 14 is a rear elevational view of the enclosure of FIG. 12.

Another embodiment of a camper is indicated at 500 in FIGS. 12-14. Camper 500 is mounted to a trailer 501, but it should it be understood that this is but one embodiment in that the camper 500 may be mounted to a truck or any other vehicle for transport, if desired. Camper 500 has many of the same components as those described above with respect to camper 10 and camper 200. Components of similar function have been identified with a "5" prefix in addition to the numbers used with respect to camper 10 or camper 200. Camper 500 includes a stationary panel assembly 512 mounted to the frame of the trailer 501 and like camper 10 and camper 200 includes primary platforms 530A and 530B which are pivotally joined to opposite edges of the stationary section assembly 512 and fold out where wall assemblies 570 and 572 each lay flat upon the stationary section assembly 512 and the primary platforms 530A and 530B where wall assembly 570 lays upon wall assembly 572 in a travel position (FIGS. 12 and 13). In this embodiment, each primary platform 530A, 530B includes a single floor panel 534.

Wall assemblies 570 and 572 are similar to camper 200 and each have a center section 580 with side panel assemblies 582A and 582B pivotally joined to opposite edges of the center panel 580. Side panels 595 and 597 are pivotally joined to outside edges of primary platforms 530A and 530B, respectively. However, in this embodiment, when the walls 570 and 572 are folded with the primary platforms 530A and 530B to a folded, travel position, side panels 595 and 597 hang downwardly from the upwardly directed remote edges 531A and 531B of the primary platforms 530A and 530B. In a preferred embodiment, each of the side panels 595 and 597 comprise two pivotally connected panels 598 and 599 along a common edge 601 (FIGS. 13 and 14). Comparing FIGS. 13 and 14, in the travel position of FIG. 13 panel 598 is pivotally connected with a 270° hinge to edge 531A or 531B and lies against primary platforms 530A, 530B, respectively. Panel 599 is pivotally connected to panel 598 along common edge 601 so that panel 599 lies along the outside surface of panel 598 in FIG. 13. When deployed in the camping position panels 598 and 599 of the walls 595, 597 are arranged as illustrated in FIG. 14 and extend upwardly due to the 270° hinge at edges 531A, 531B.

In the folded, compact travel position, a roof structure 600 includes a center section 602 and side roof panels 604A and 604B pivotally connected to opposite edges of the center roof section 602. In this embodiment, center roof structure 602 includes panels 602A and 602B secured to each other, in one embodiment, in a fixed inclined position.

The camper 600 is unfolded into a camping position similar to camper 200 described above. Referring to FIG. 13, telescoping supports 601 (schematically illustrated), which can be manually operated or power operated, are secured to the trailer frame 501 at lower ends and are secured to the center roof structure 602 at upper ends, two in the front and two in the back. To deploy the camper 600 the center roof section 602 is lifted upwardly to its normal elevated position or slightly above by supports 601. Side supports 605 (one of which is illustrated in FIG. 14, but there would typically be four in total) are then connected and deployed to hold each of the roof panels 604a and 604b in an upward position. The side supports can be similar to supports 407 in camper 200 being structurally connected to the lateral supports (not shown) that support the primary platforms 530A, 530B.

With the roof structure 600 elevated (like roof structure 400 in camper 200) and the side panels 604A and 604B out of the way, the primary platform 530A and 530B with the wall assemblies 570 and 572, as well as the side walls 595 and 597 can be lowered, where the primary platforms 530A, 530B are typically lowered upon lateral supports (not shown, but similar to lateral supports 50, 250) and ground supports 553 are connected to remote ends of the lateral supports. In another embodiment ground supports 553 can be used without lateral supports. Typically the side walls 595 and 597 are located so as to extend outwardly from the unfolded primary panels 530A and 530B. This is schematically illustrated in FIG. 14 by side wall 597.

The wall assemblies 570 and 572 are then tilted upwardly. Wall assembly 570 is held against or secured to a front support panel, not shown, but similar in function to support panel 79 or 298. If desired, internal supports can span between the wall assemblies 570 and 572 to help hold them in the upright position. Side walls 595 and 597 can then be tilted into position and secured to side edges of the wall assemblies 570 and 572 with suitable latches, clasps, straps, etc. The supports 605 for the roof panels 604a and 604b as well as the supports 601 for the center section 602 can then be lowered such that the roof 600 can be suitably secured to the upper edges of wall assemblies 570 and 572 and the side walls 595 and 597 using suitable fasteners.

FIG. 14 schematically shows another support 620 that can be used to support roof panels 604A, 604B in a position at, or preferably slightly above it position secured to side walls 595, 597. Typically, four supports 620 would be provided, two in the front and two in the back. Support 620 comprises two links 620A, 620B that are pivotally joined to each other at 620C. One end of link 620A is joined to trailer 501, while at remote end of link 620B is joined to the roof panels 604A, 604B, herein illustrated as being connected to roof panel 604A. A locking element 622 such as cylinder, but it could take any number of forms, selectively substantially inhibits or allows the links 620A, 620B to pivot relative to each other at pivot 620C. In dashed lines, locking element 622 substantially inhibits links 620A, 620B from pivoting thus maintaining support 620 at its longest extent. This causes roof panel 604A to be held at a position above side panel 595. However, when it is desired to lower roof panel 604A, the locking element 622 is moved away from pivot 620C, thus allowing the links 620A, 620B to pivot and the roof panel 604A to lower. It should be noted supports similar to supports 620 could be used in place of supports 405 with the camper illustrated in 9-11 to hold panels 436.

The supports 620 can be used on the previous embodiments for example in place of supports 405, could be operatively connected to panels 436 and panel 298 at one end of the panels 436 and operatively connected to panels 436 and the rear portion of the camper, such as to extension 300, at the other end of the panels 436.

It should also be noted having the ability to raise any of the roof panels in camper 200 or camper 500 can be advantageous in that it will allow heat within the camper to escape, thereby helping the camper to stay cooler.

Figure 18:
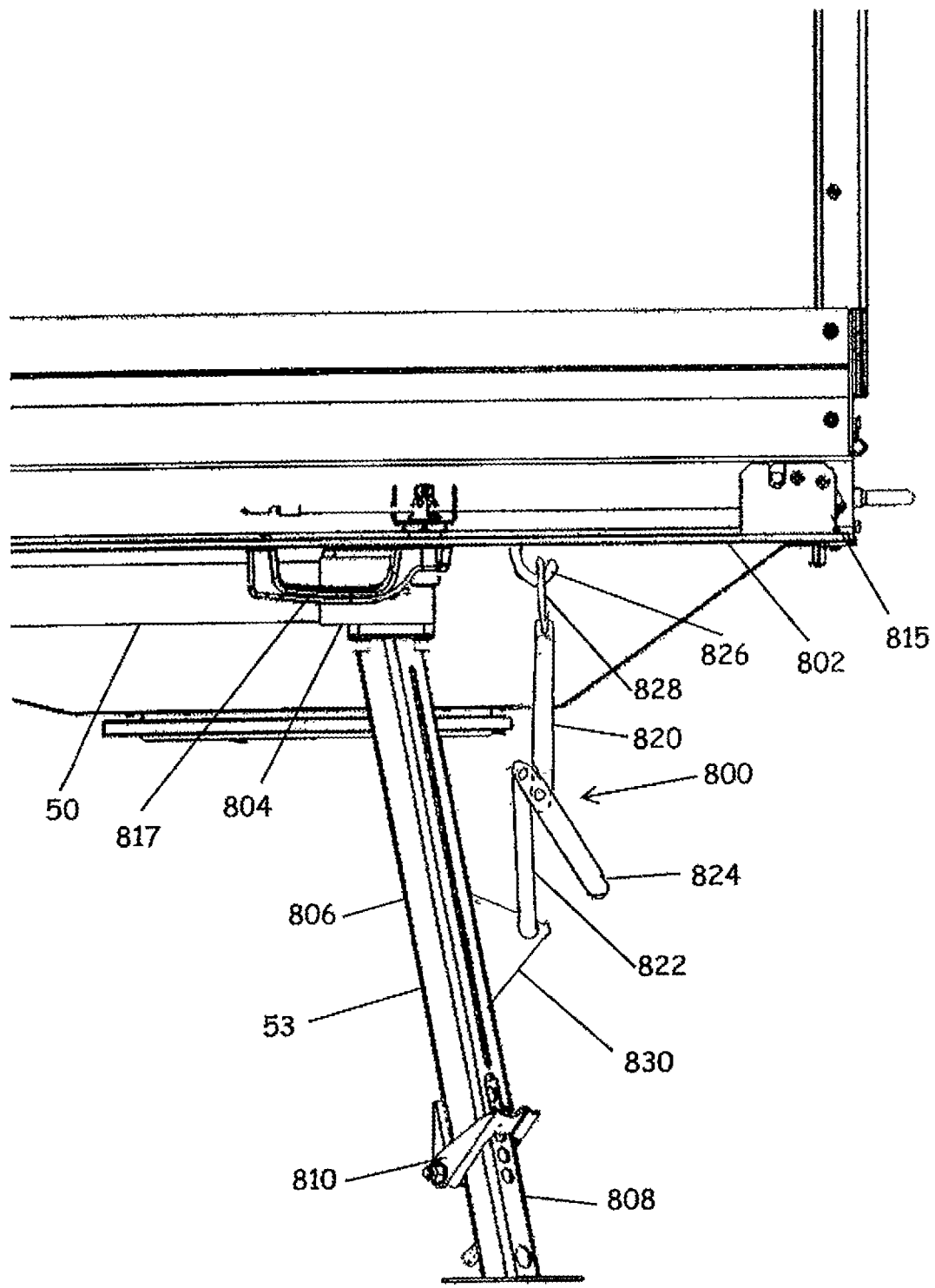
FIG. 18 is a perspective view of a holding device.
Figure 19:
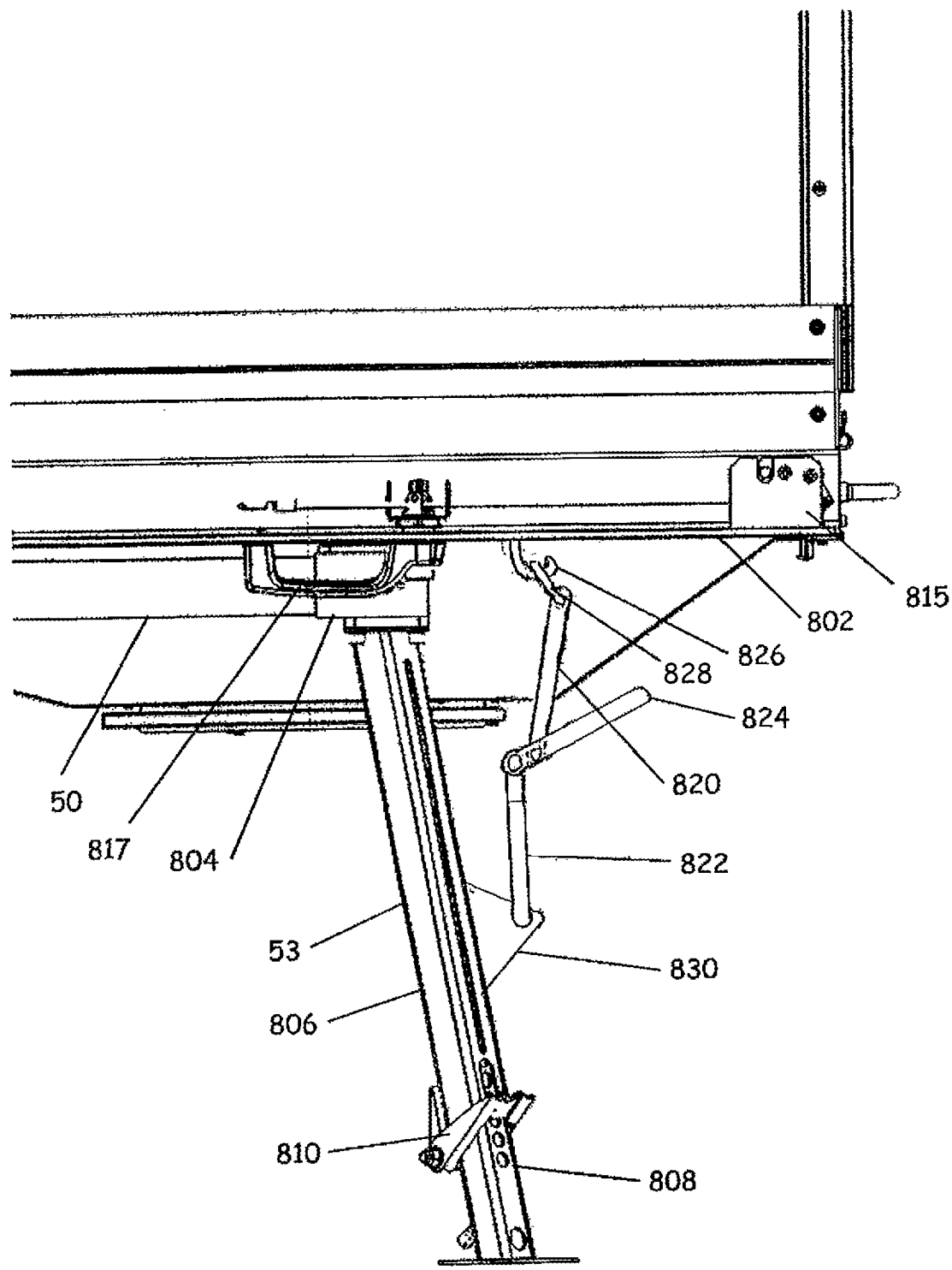
FIG. 19 is a perspective view of the holding device of FIG. 18.

FIGS. 18 and 19 illustrate a holding device 800 that holds a panel 802 (of the primary platform) forming part of the floor in the extended position of the camper against the lateral support 50, thereby making the panel 802 secured relative to lateral support 50 and other portions of the camper such as the center stationary section or ground support 53. Panel 802 represents any of the panels of the primary platforms of the campers described above that rest upon the lateral support 50 in the extended position. Ground support 53 is mounted to the lateral support 50, commonly, in a removable manner. In the exemplary embodiment illustrated, the ground support 53 is slidably couplable to an end of the lateral support 50, where one of the ends, herein end 804 of the ground support 53, includes a receiver of size and shape to receive an end of the ground support 53.

In this embodiment, the panel 802 includes a latch 815 operable by a user operated handle 817 that holds the panel 802 in the travel or storage position.

Generally, the holding device 800 releasably secures the panel 802 to the lateral support 50. The holding device 800 can be directly secured to the lateral support 50 or an element connected thereto. In a particularly convenient embodiment, the holding device 800 operates between the ground support 53 and the panel 802, since the ground support 53 is secured, herein in a removable manner, to the lateral support 50. In further convenient embodiment, the holding device 800 operates between a portion of the lateral support 50 (e.g., a portion of ground support 53) that maintains a consistent position with respect to a portion of the panel 802 when the panel 802 is secured to the lateral support 50.

Commonly, the ground support 53 is adjustable having at least a second portion 808 movable to a first portion 806 so as to allow the ground support 53 to adjust to the terrain upon which the camper is located. In the exemplary embodiment illustrated, the first portion 806 and the second portion 808 are slidably coupled, herein in a telescoping manner, where the second portion 808 is rigidly secured to end 804 and slides within the first portion. A latch 810 fixes the second portion 808 to the first portion 806 when the desired length of the ground support 53 has been obtained.

Generally, the holding device 800 includes an actuator that generates a force upon the panel 802 so that the panel 802 is held against the lateral support 50 or ground support 53. Various forms of mechanisms can be used to provide a mechanical advantage to generate the force such as, a clamp or latch, a piston/cylinder device or a threaded screw. A particularly advantageous and convenient mechanism is a latch (schematically illustrated) having a first member 820 secured to the panel 802 and a second member 822 secured to the portion 808 of the ground support 53 that maintains a fixed position relative to the lateral support 50 when the ground support 53 is mounted to the lateral support 50. In the embodiment illustrated, a lever arm 824 is secured to both the first element 820 and the second element 822, which moves the first element 820 relative to the second element 822 to generate a force pulling the panel 802 toward the lateral support 50 (FIG. 18), herein toward the portion 808 of the ground support 53 since the ground support 53 is secured to the lateral support 50, or to release the panel 802 (FIG. 19).

Preferably at least one of the first element 820 and/or the second element 822 is removably secured to the panel 802 and ground support 53, respectively, once the panel 802 has obtained a position at least proximate the lateral support 50 or ground support 53. The panel 802 includes an attachment point herein a hook 826 although other suitable devices include but are not limited to a loop secured to the panel 802 or even an aperture in the panel 802. In the embodiment illustrated, the first member 820 includes a link 828 that is attached to the hook 826. Likewise, the second member 822 is permanently or removably secured to the portion 808 of the ground support 53, herein upon a standoff or mounting flange 830. If desired, a spring can be provided so as to limit the hold down force generated and/or improve ease of operation of the holding device 800. For instance, any of the elements 820, 822, 826, 828 and/or 830 can include a spring or be made of an elastic material that can stretch to provide a spring function.

Figure 20:
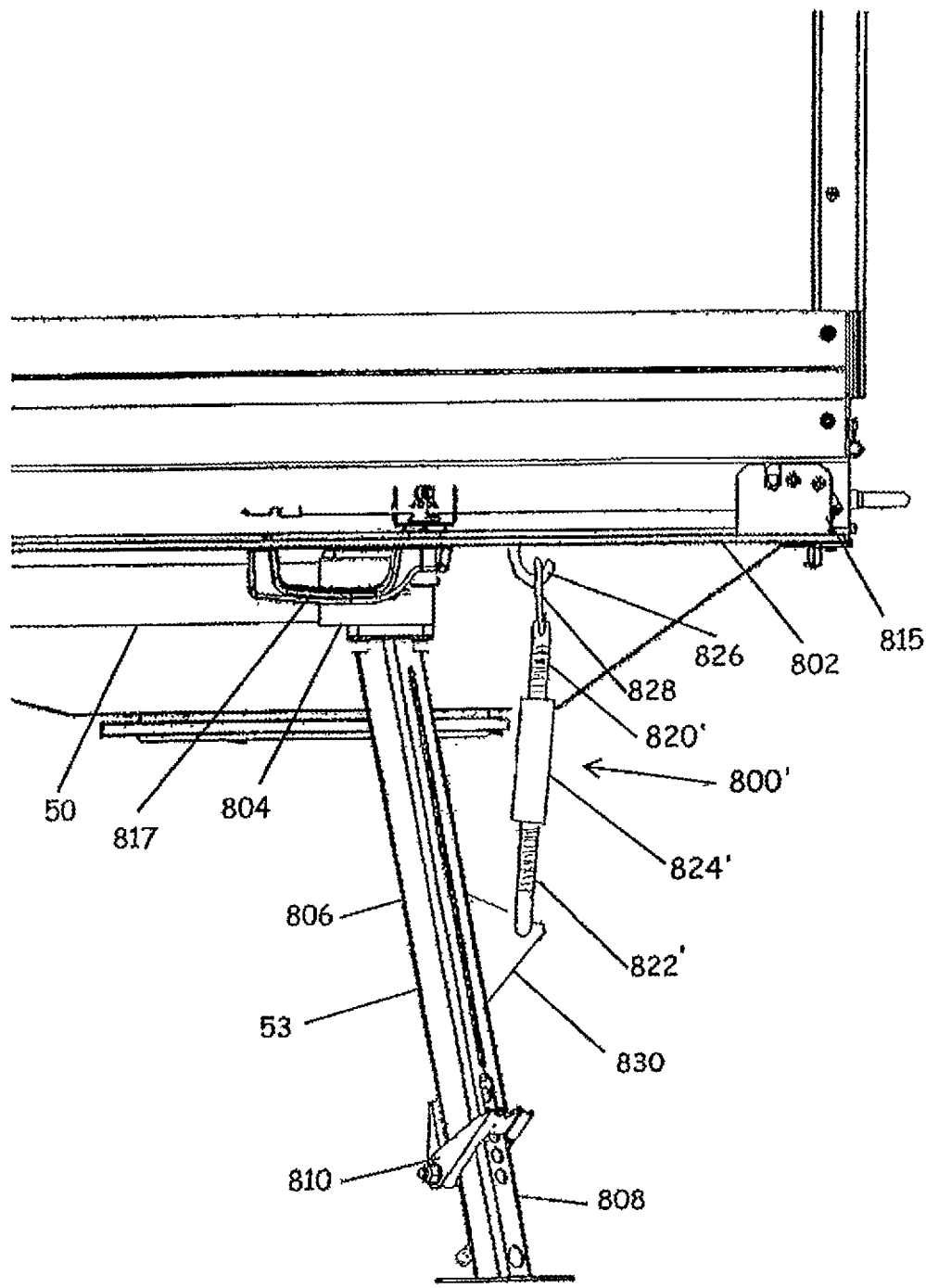
FIG. 20 is a perspective view of a second embodiment of a holding device.

In FIG. 20, a holding device 800' includes an actuator in the form of one or more threadably mating sections. In the embodiment illustrated a first member 820' is removably secured to the panel 802 and a second member 822' is secured, if desired, removably, to the portion 806 of the ground support 53 that maintains a fixed position relative to the lateral support 50 when the ground support 53 is mounted to the lateral support 50. In the illustrated embodiment, each of members 820' and 822' threadably mate with a center, user operable, section 824' although if desired only one of the members 820' or 822' need threadably mate with section 824'. In operation, with each of the members 820' and 822' secured to panel 802 and portion 806 respectively, rotation of center section 824' in a first direction pulls members 820' and 822' together to generate a hold down force, while rotation of center section 824' in the other direction separates members 820' and 822' from each other allowing at least one of the members 820' and 822' to be decoupled so that the panel 802 can be lifted off the lateral support 50. The attachment point 826 can be as described above. A link 828 can also be present, if desired.

Figure 21:
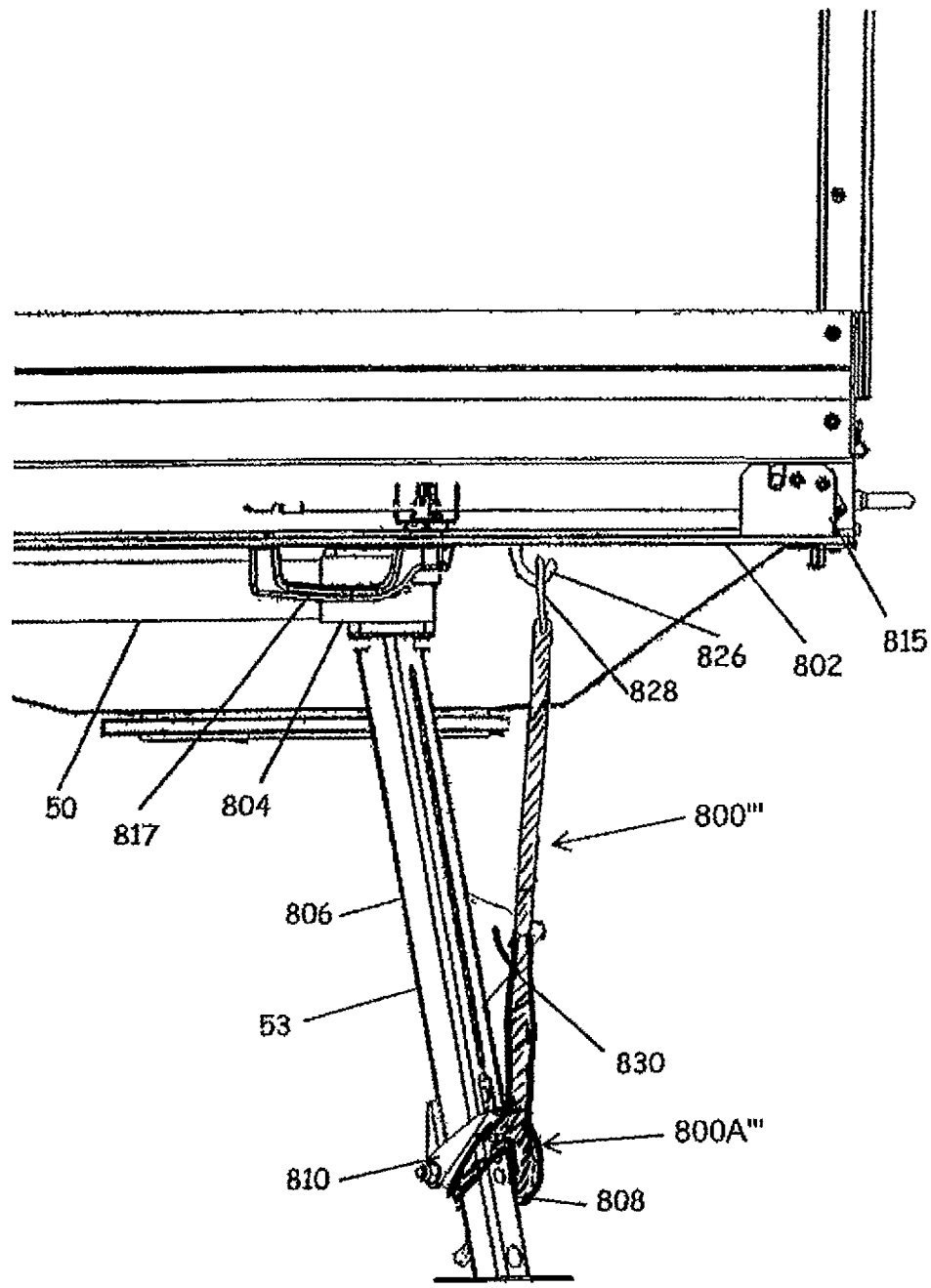
FIG. 21 is a perspective view of a third embodiment of a holding device.

FIG. 21 illustrates yet another embodiment of a holding device 800". Holding device 800" is a flexible rope, strap or the like, which if desired can be stiff or non-resilient in tension. In the embodiment illustrated, the holding device 800" is secured to hook 826 and standoff 830, although the rope, strap or the like can be secured to any convenient point on ground support 53 such as below latch 810, for example, wrapped around leg 53 (illustrated by portion 800A'''). Holding device 800" can also be a spring (coiled spring, rubber, bungee, etc) or have a spring joined to the flexible rope, strap or the like, if desired.

Figure 22:
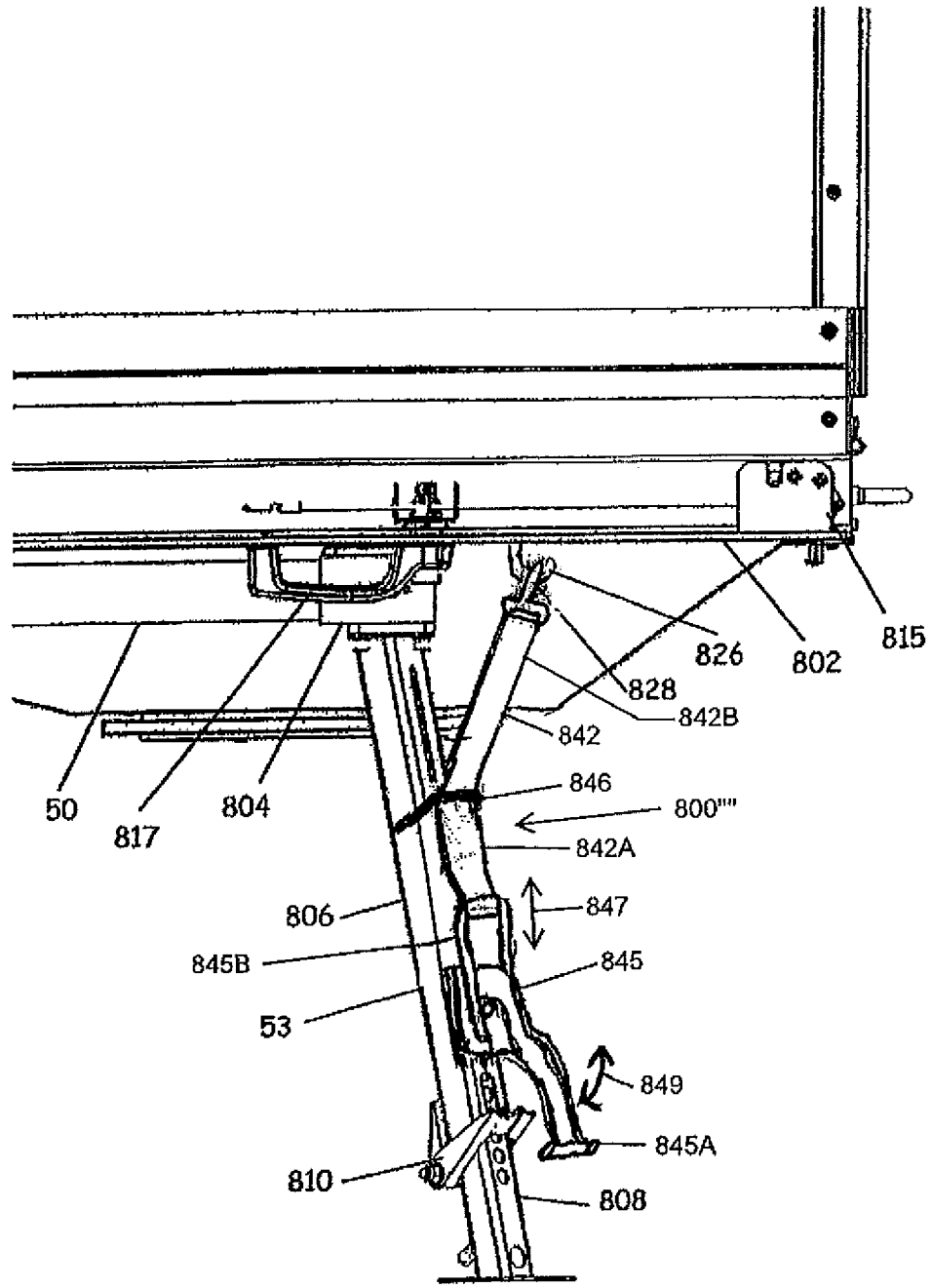
FIG. 22 is a perspective view of fourth embodiment of a holding device.

FIG. 22 illustrates yet another embodiment a holding device 800'''. Holding device 800''' includes an actuator that generates a force that secures upon the panel 802 so that the panel 802 is held against the lateral support 50 or ground support 53. In this embodiment, a flexible member 842 such as a rope, strap or the like that releasably connects to hook 826 with a hook 828 or the like. On end opposite the hood 828, the flexible member 842 is connected to the actuator herein embodied as a latch 845. The latch 845 is secured to the ground support 53. Preferably, the flexible member 842 is guided by a guide element 846 such as a loop or the like secured to ground support 53. In this manner, a first portion 842A of the flexible member 842 between the guide element 846 and the latch 845 is configured so as to be efficiently or most effectively pulled by the moving latch member 845B in the direction indicated by double arrow 847 with rotation of the latch handle 845A in the direction indicated by double arrow 849, while a second portion 842B of the flexible member 842 between the guide element 846 and the hook 828 efficiently or effectively pulls the panel 802 down toward and preferably upon lateral support 50.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A transportable fold-out at least partial enclosure comprising:
    a center stationary section of size to substantially conform to a width of a vehicle;
    a pair of primary platform assemblies, each primary platform assembly comprising a first panel pivotally joined to a side of the center stationary section and a second panel pivotally joined to the first panel on a side of the first panel opposite the center stationary section, wherein the primary platform assemblies are configured to fold to a transport position wherein outer edges of each of the second panels on sides thereof opposite each associated first panel are positioned proximate each other and above the center stationary section; and
    at least one wall assembly pivotally joined to the center stationary section and each of the primary platform assemblies to pivot from a first position wherein the wall assembly lies upon the primary platform assemblies and the center stationary section and a second position where the wall assembly is pivoted away from the center stationary section and each of the primary platform assemblies, the at least one wall assembly comprising a center panel pivotally joined to the center stationary section and a pair of side panel assemblies, each side panel assembly comprising a third panel pivotally joined to a side of the center panel and a fourth panel pivotally joined to the third panel on a side of the third panel opposite the center panel, wherein the primary platform assemblies and the at least one wall assembly are configured to fold to a transport position wherein the second panels are positioned above the center stationary section while each the third panel is adjacent an associated first panel and each fourth panel is adjacent an associated second panel.

2. The transportable fold-out at least partial enclosure of claim 1 wherein the at least partial enclosure comprises two horizontal levels, a first level being provided by at least one of the primary platform assemblies.

3. The transportable fold-out at least partial enclosure of claim 2 wherein a second horizontal level is below the first level substantially conforming to a floor of a pickup box or truck rear deck.

4. The transportable fold-out at least partial enclosure of claim 3 wherein a third horizontal level is provided above the first level.

5. The transportable fold-out at least partial enclosure of claim 4 wherein the third horizontal level comprises a compartment configured to extend over a roof of the vehicle.

6. The transportable fold-out at least partial enclosure of claim 1 wherein the vehicle comprises a pickup having a cab and a pickup box wherein the transportable fold-out at least partial enclosure is configured to be supported by the pickup box behind the cab, and wherein the first panels are inclined and face each other in the transport position to approximate a shape or inclination of side components of the cab supporting a roof of the cab.

7. The transportable fold-out at least partial enclosure of claim 1 and a second wall assembly pivotally joined to the center stationary section and each of the primary platform assemblies on sides opposite the at least one wall assembly to pivot from a first position wherein the second wall assembly lies upon panels of the at least one wall assembly and a second position where the wall assembly is pivoted away from the center stationary section and each of the primary platform assemblies, the second wall assembly comprising a second center panel pivotally joined to the center stationary section and a second pair of side panel assemblies, each second side panel assembly comprising a third panel pivotally joined to the center panel and pivotally joined to one of the first panels and a fourth panel pivotally joined to the third panel and pivotally joined to the second panel.

8. The transportable fold-out at least partial enclosure of claim 1 and further comprising a cover panel is releasably joined to the primary platform assemblies or the center stationary section.

9. The transportable fold-out at least partial enclosure of claim 1 and further comprising a lateral support for each primary platform assembly, wherein each lateral support is disposed under the first and second panels of one of the primary platform assemblies when the primary platform assemblies are in extended positions where the first and second panels are at least substantially parallel to each other.

10. A transportable at least partial enclosure comprising:
    a platform assembly comprising a stationary center section and a first primary platform pivotally joined to the stationary center section and a second primary platform pivotally joined to the stationary center section on a side opposite the first primary platform;
    a first wall joined to the platform assembly;
    a second wall joined to the platform assembly spaced apart from the first wall;
    a roof structure having a center roof section and a first side roof panel pivotally joined to the center roof section and a second side roof panel pivotally joined to the center roof section on a side opposite the first side roof panel, wherein the first side roof panel is disposable above the first primary platform and the second side roof panel is disposable above the second primary platform, each of the first primary platform and the second primary platform being pivotal with respect to the stationary center section from a position extending above the stationary center section to an extended position wherein the first primary platform and the second primary platform extend away from the stationary center section in opposite directions;
    a first plurality of center section extendible supports coupled to the center roof section to lift the center roof section; and
    at least one side roof panel extendible support for each side roof panel to lift each side roof panel.

11. The transportable at least partial enclosure of claim 10 wherein each of the walls comprise a center panel pivotally joined to the center stationary section a first wall panel pivotally joined to the center panel and pivotally joined to first primary platform and a second wall panel pivotally joined to the center panel and pivotally joined to the second primary platform wherein the first and second primary platforms are pivotable toward and away from each other.

12. The transportable at least partial enclosure of claim 11 and further comprising a second extendible support for each of the side roof panels configured to lift each corresponding side roof panel with the associated at least one side roof panel extendible support.

13. The transportable at least partial enclosure of claim 12 and further comprising a first lateral support configured to support the first primary platform in the extended position and a second lateral support configured to support the second primary platform in the extended position.

14. The transportable at least partial enclosure of claim 13 wherein the at least one side roof panel extendible support associated with each side roof panel is joined to the associated lateral support.

15. A transportable fold-out at least partial enclosure comprising:
- a center stationary section;
- a pair of primary platforms comprising a first primary platform pivotally joined to the center stationary section and a second primary platform pivotally joined to the center stationary section on a side opposite the first primary platform, wherein the first and second primary platforms are pivotable toward and away from a transport position wherein outer portions thereof are disposed above the center stationary section;
- at least one wall assembly pivotally joined to the center stationary section and each of the primary platforms to pivot from a first position wherein the wall assembly lies upon the primary platforms and the center stationary section and a second position where the wall assembly is pivoted away from the center stationary section and each of the primary platforms, the at least one wall assembly comprising a center panel pivotally joined to the center stationary section and a first side panel pivotally joined to the center panel and pivotally joined to the first primary platform and a second side panel pivotally joined to the center panel and pivotally joined to the second primary platform; and
- a pair of lateral supports extending outwardly from the center stationary section in opposite directions, wherein each primary platform is supported by one of the lateral supports; and
- a pair of holding devices, each holding device operably coupled to one of the lateral supports and the associated primacy platform assembly to generate a force to hold the associated primary platform against the one of the lateral supports.

16. The transportable fold-out at least partial enclosure of claim 15 wherein each holding device comprises an actuator.

17. A transportable fold-out at least partial enclosure comprising:
- a center stationary section;
- a pair of primary platforms comprising: a first primary platform pivotally joined to the center stationary section and a second primary platform pivotally joined to the center stationary section on a side opposite the first primary platform, wherein the first and second primary platforms are pivotable toward and away from a transport position wherein outer portions thereof are disposed above the center stationary section;
- a pair of wall assemblies, each wall assembly pivotally joined to the center stationary section and each of the primary platforms to pivot from a first position wherein the wall assembly lies above the primary platforms and the center stationary section and a second position where each wall assembly is pivoted away from the center stationary section and each of the primary platforms so as to face each other, each wall assembly comprising a center panel pivotally joined to the center stationary section and a first side panel pivotally joined to the center panel and pivotally joined to the first primary platform and a second side panel pivotally joined to the center panel and pivotally joined to the second primary platform;
- a first covering panel connected to the first primary platform and extending along a length of first primary platform from a first end to a second end thereof and is disposed above the center stationary section and extends toward an outer portion of the second primary platform in the transport position, and wherein the first covering panel is releasably couplable to each wall assembly in the second position thereof so as to form a first side wall extending between the wall assemblies; and
- a second covering panel connected to the second primary platform and extending along a length of second primary platform from a first end to a second end thereof and is disposed above the center stationary section and extends toward the outer portion of first primary platform in the transport position, and wherein the second covering panel is releasably couplable to each wall assembly in the second position thereof so as to form a second side wall extending between the wall assemblies.

18. The transportable fold-out at least partial enclosure of claim 17 wherein the vehicle comprises a pickup having a cab and a pickup box wherein the transportable fold-out at least partial enclosure is configured to be supported by the pickup box behind the cab, and wherein the first primary platform and the second primary platform are inclined and face each other in the transport position to approximate a shape or inclination of side components of the cab supporting a roof of the cab.

19. The transportable fold-out at least partial enclosure of claim 9 wherein each lateral support is storable under the center stationary section in the transport position and is adjustable so as to be positioned underneath each associated primary platform assembly in the extended positions of the primary platforms assemblies.

20. The transportable fold-out at least partial enclosure of claim 9 and further comprising at least one ground support for each lateral support of each primary platform assembly, wherein each of the at least one ground support is configured to engage a ground surface when each associated primary platform assembly is in the extended position.

* * * * *